(12) United States Patent
Hoffman et al.

(10) Patent No.: US 8,443,039 B2
(45) Date of Patent: *May 14, 2013

(54) METHOD AND APPARATUS FOR DISTRIBUTING VIRTUAL GOODS OVER THE INTERNET

(75) Inventors: Steven Samuel Hoffman, San Francisco, CA (US); Naomi Kokubo, San Francisco, CA (US)

(73) Assignee: Hyperlayers, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/363,339

(22) Filed: Jan. 31, 2012

(65) Prior Publication Data

US 2012/0131086 A1    May 24, 2012

Related U.S. Application Data

(63) Continuation of application No. 12/037,097, filed on Feb. 25, 2008, now Pat. No. 8,108,459.

(60) Provisional application No. 60/940,955, filed on May 30, 2007, provisional application No. 60/941,250, filed on May 31, 2007, provisional application No. 60/941,258, filed on May 31, 2007, provisional application No. 60/941,261, filed on May 31, 2007, provisional application No. 60/955,137, filed on Aug. 10, 2007, provisional application No. 60/955,144, filed on Aug. 10, 2007, provisional application No. 60/974,438, filed on Sep. 21, 2007.

(51) Int. Cl.
*G06F 15/16* (2006.01)

(52) U.S. Cl.
USPC ............. 709/203; 709/223; 709/224; 463/16; 463/42

(58) Field of Classification Search .................. 709/203, 709/206, 223, 224; 463/16, 42
See application file for complete search history.

(56) References Cited

U.S. PATENT DOCUMENTS

| | | | |
|---|---|---|---|
| 6,106,395 A | 8/2000 | Begis | |
| 6,268,872 B1 | 7/2001 | Matsuda et al. | |
| 6,314,475 B1 * | 11/2001 | Collin et al. ................ | 710/15 |
| 6,612,932 B2 | 9/2003 | Stern | |
| 6,618,593 B1 | 9/2003 | Drutman et al. | |
| 6,729,884 B1 | 5/2004 | Kelton et al. | |
| 6,749,511 B2 * | 6/2004 | Day ............................. | 463/42 |
| 6,847,940 B1 | 1/2005 | Shelton | |
| 6,879,994 B1 | 4/2005 | Matsliach et al. | |
| 7,249,139 B2 | 7/2007 | Chuah et al. | |
| 7,412,422 B2 | 8/2008 | Shiloh | |
| 7,455,586 B2 * | 11/2008 | Nguyen et al. ................ | 463/16 |

(Continued)

*Primary Examiner* — Wing F Chan
*Assistant Examiner* — Tesfay Yohannes
(74) *Attorney, Agent, or Firm* — Pillsbury Winthrop Shaw Pittman LLP

(57) ABSTRACT

A Virtual Collectible Distribution Network generates and distributes Virtual Collectible objects, each potentially possessing unique properties, over a computer network such as the Internet, to a group of users. The Distribution Network utilizes a client-server system. The client software can be standalone or embedded in another application, such as a web browser or game. In one scenario, the client software observes certain behaviors of the user, and communicates such behavior to the server, which process is transparent to the user. The server, based on the communications from the client, predefined algorithm, and other factors, may decide to award the user with a Virtual Collectible.

10 Claims, 23 Drawing Sheets

U.S. PATENT DOCUMENTS

| | | |
|---|---|---|
| 7,480,727 B2 * | 1/2009 | Domschitz .................... 709/231 |
| 7,529,797 B2 | 5/2009 | Tseng et al. |
| 7,925,703 B2 | 4/2011 | Dinan et al. |
| 8,002,617 B1 | 8/2011 | Uskela et al. |
| 2002/0013174 A1 | 1/2002 | Murata |
| 2002/0052925 A1 * | 5/2002 | Kim et al. .................... 709/217 |
| 2002/0065136 A1 * | 5/2002 | Day ................................. 463/42 |
| 2002/0065826 A1 | 5/2002 | Bell et al. |
| 2002/0068631 A1 * | 6/2002 | Raverdy et al. ................. 463/42 |
| 2002/0094870 A1 | 7/2002 | Murray |
| 2002/0099818 A1 * | 7/2002 | Russell et al. ................ 709/224 |
| 2002/0120501 A1 | 8/2002 | Bell et al. |
| 2003/0014423 A1 | 1/2003 | Chuah et al. |
| 2003/0156135 A1 | 8/2003 | Lucarelli et al. |
| 2003/0191816 A1 | 10/2003 | Landress et al. |
| 2004/0058694 A1 | 3/2004 | Mendiola et al. |
| 2004/0122895 A1 | 6/2004 | Gourraud |
| 2005/0086605 A1 | 4/2005 | Ferrer et al. |
| 2005/0137015 A1 | 6/2005 | Rogers et al. |
| 2005/0174975 A1 | 8/2005 | Mgrdechian et al. |
| 2006/0282426 A1 | 12/2006 | Spears |
| 2006/0282530 A1 * | 12/2006 | Klein et al. .................... 709/224 |
| 2007/0030824 A1 | 2/2007 | Ribaudo et al. |
| 2007/0037574 A1 | 2/2007 | Libov et al. |
| 2007/0043583 A1 | 2/2007 | Davulcu et al. |
| 2007/0043646 A1 | 2/2007 | Morris |
| 2007/0067441 A1 * | 3/2007 | Pomerantz .................... 709/224 |
| 2007/0078962 A1 * | 4/2007 | Donnelli et al. .............. 709/223 |
| 2007/0150537 A1 | 6/2007 | Graham |
| 2007/0150603 A1 | 6/2007 | Crull et al. |
| 2007/0203828 A1 | 8/2007 | Jung et al. |
| 2007/0294351 A1 * | 12/2007 | El-Emam ...................... 709/206 |
| 2008/0046363 A1 * | 2/2008 | Ali et al. ......................... 705/40 |
| 2008/0046458 A1 | 2/2008 | Tseng et al. |
| 2008/0059575 A1 | 3/2008 | Malobrodsky et al. |
| 2008/0097851 A1 | 4/2008 | Bemmel et al. |
| 2008/0097871 A1 | 4/2008 | Williams et al. |
| 2008/0102947 A1 | 5/2008 | Hayes |
| 2008/0104496 A1 | 5/2008 | Williams et al. |
| 2008/0140650 A1 | 6/2008 | Stackpole |
| 2008/0160877 A1 | 7/2008 | Lipman |
| 2008/0215975 A1 * | 9/2008 | Harrison et al. .............. 715/706 |
| 2008/0215995 A1 | 9/2008 | Wolf |
| 2008/0262910 A1 | 10/2008 | Altberg et al. |
| 2008/0262911 A1 | 10/2008 | Altberg et al. |
| 2009/0152349 A1 | 6/2009 | Bonev et al. |
| 2009/0198666 A1 | 8/2009 | Winston |
| 2009/0241035 A1 | 9/2009 | Tseng et al. |
| 2009/0254459 A1 | 10/2009 | Williams |
| 2009/0271212 A1 | 10/2009 | Savjani et al. |
| 2012/0015668 A1 | 1/2012 | Mgrdechian |

* cited by examiner

METHOD AND APPARATUS FOR DISTRIBUTING VIRTUAL GOODS OVER THE INTERNET

CROSS-REFERENCE TO RELATED APPLICATIONS

The present application is a continuation of U.S. patent application Ser. No. 12/037,019 filed Feb. 25, 2008, now U.S. Pat. No. 8,108,459, which claims priority to U.S. Provisional Appln. No. 60/940,955 filed May 30, 2007, U.S. Provisional Appln. Nos. 60/941,250, 60/941,258 and 60/941,261, all filed May 31, 2007, U.S. Provisional Appln. Nos. 60/955,137 and 60/955,144 filed Aug. 10, 2007, and U.S. Provisional Appln. No. 60/974,438 filed Sep. 21, 2007, the contents of which are incorporated by reference herein in their entirety.

FIELD OF THE INVENTION

The present invention relates to computer and network software, and more particularly it relates to a system and method for distributing virtual objects over a computer network such as the Internet.

BACKGROUND OF THE RELATED ART

There has been a recent surge in "virtual world" technologies that allow users to assume virtual identities (e.g. avatars) and to interact with other users online, such as Second Life, Habbo, Zwinky, Gaia, Club Penguin, Webkinz. These are typically accessed via dedicated websites and subscriptions, and are typically closed systems (i.e. a user in one virtual community cannot directly interact with users in other virtual communities). These online communities sometimes further offer virtual items that can be bought and sold within their virtual worlds, such as virtual furniture, virtual clothing, virtual real estate, etc.

One problem with existing "virtual world" products is that they typically require users to go to specific online destinations to acquire and use these virtual items rather than allowing users to pick up and use virtual items while browsing any website on the Internet. Accordingly, it would be desirable if a system was provided in which users could obtain and use virtual objects and virtual goods while they surf anywhere on the worldwide web.

Some other existing products and services attempt to reward users for surfing the Internet with real-world discounts, frequent flier miles, cash, or others. These products typically operate on an accumulated point system. One example of this type of prior art reward program is U.S. Pat. No. 6,749,511, which discloses a website promotional process. It requires a user to visit a host site and then browse through a plurality of advertiser or affiliate sites whose hyperlinks are provided at that host site to find and match a number of embedded indicia. It further requires the indicia to be embedded within the advertiser or affiliate sites that are promoted by the host site. A prize is rewarded if the participant finds a sufficient number of matching indicia within a designated time period.

One major disadvantage of these "reward" products is that they lack entertainment value and thus fail to retain user interest, even though sometimes they are described as "games." These "rewards" such as points or currency typically have no entertaining features themselves such as visual art, animation or sounds. Furthermore, they do not provide the users with any special abilities or powers that could be used in an online game, and they provide no other decorative or personalizable value for the user. Moreover, similar to the products and services described above, they do not allow the users to casually surf the web at their own leisure and be entertained at the same time. So, for most users, earning such "rewards" points or currency can be a monotonous chore rather than an entertaining experience in itself. Accordingly, it would be desirable if a system was provided in which finding Virtual Collectibles while browsing the web is an entertaining experience, and where such Virtual Collectibles themselves provided entertainment such as graphics, animation and special functionality, thereby adding entertainment to web browsing activity.

Another major disadvantage with these point-based products is that the points lack the ability to be associated with brands or advertisers' products. The generic reward units, such as points or miles that a user collects from different websites, cannot be made different from one another. Ten points earned from visiting website A is no different than ten points earned elsewhere. It would be desirable if different rewards could be configured to possess unique properties associated with a certain name or brand or product. An advertiser or affiliate could then give to users who visit their websites Virtual Collectibles that possess special properties that promote their brands, services or goods.

A further disadvantage, exemplified by the above-identified patent among others, is that reward program advertisers or affiliates must, in addition to paying a fee to the host site, provide support within their websites of content needed to support the accumulation of points and rewards (i.e. indicia such as a JPEG file with a predetermined filename and located at a URL associated with a sponsor). This is intrusive and burdensome on such organizations. Moreover, participants must allow cookies to be stored on their computers, which not all participants are willing to do and/or which can be easily disabled or defeated.

Another problem with existing virtual world products and technologies is that the virtual objects are often not unique in their appearances or properties. Uniqueness is a major component of virtual objects' appeal, especially important if the virtual objects or virtual goods are collectible objects (i.e. Virtual Collectibles). Because of their virtual nature, these virtual objects can easily lose user interest if the users feel that these objects are being mass-generated and easily obtainable. Hence, it would be desirable for Virtual Collectibles to have unique properties because users derive pleasure and satisfaction knowing that, for example, a virtual object they own is one-of-a-kind, or one of only a limited number available, or has a magical power that enhances overall value of everything else the user owns. In addition, it would be desirable if such different properties could provide different effects, such as giving users special powers, or bestowing extra real-world redeeming values upon the Virtual Collectibles.

Accordingly, a need remains in the art for a system and method of distributing Virtual Collectibles that overcomes the above and other disadvantages.

SUMMARY OF THE INVENTION

The present invention relates generally to the field of computer and network software, and more particularly it relates to a computer system and method for distributing virtual objects or virtual goods over the Internet. According to one aspect, the invention enables virtual objects or virtual goods (i.e. Virtual Collectibles) to be generated and made available to users when users visit certain websites. According to another aspect, the invention enables users to communicate and exchange Virtual Collectibles with one another. According to yet another aspect of the invention, the Virtual Collectibles can possess unique properties or unique combinations of attributes which provide entertainment value and/or branding value that makes them superior to traditional reward points.

In furtherance of these and other aspects, a method and apparatus according to the invention includes a client-server system where the server centrally generates, tracks the movement of, and distributes virtual objects, and the client application communicates with the server and provides an interface for the user to interact with the server and other users. The client software can be a standalone application, an application embedded into another application, such as a web browser plug-in, or a combination of both. The client software monitors behaviors of the user, and communicates such behavior to the server. The server, based on the communications from the client, predefined rules, and other factors, may make decisions as to generating one or more virtual objects with special properties, and giving the virtual objects to the user. The underlying mechanism is invisible to the user, and so the user can surf the web casually as usual. The server can perform other tasks such as recordation of all virtual objects in the distribution network, facilitating communications and exchange of virtual objects among users, and destruction or recycling of virtual objects due to events such as abandonment or redemption. The client's functions include monitoring user behavior, displaying virtual objects, and facilitating interaction between the user, server, and other users.

DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Figure 1:
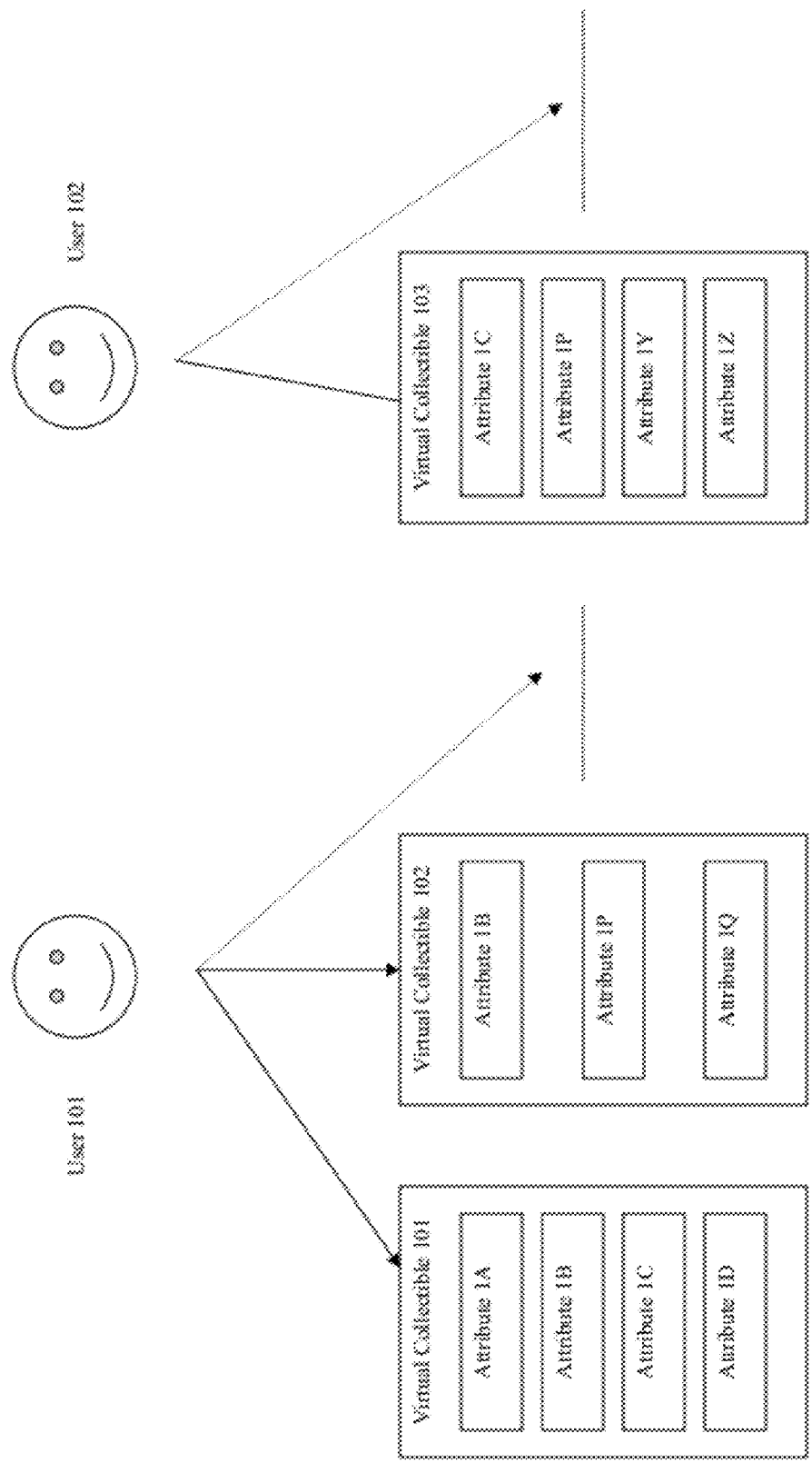
FIG. 1 is a block diagram illustrating the basic concepts of a Virtual Collectible according to the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention provides Internet users with an entertaining and rewarding experience as they surf the web at their own leisure and pace, while at the same time giving advertisers and sponsors more resources to effectively draw online traffic and promote their products and services, as well as to enhance brand recognition by rewarding users with objects that are associated with specific brands or products.

According to some aspects, the present invention recognizes that online traffic is a precious commodity among web advertisers and promoters. For one, increased net traffic often translates directly into increased revenues for websites that engages in the sale of goods and services. Second, many websites that provide information but do not engage in sales generate their revenues by charging for advertising space on their webpages. Examples include search engines and "blog" websites. These websites usually charge advertisers by the number of clicks on the advertisers' links. For these websites, web traffic has a two-prong importance. First, a threshold amount of online traffic must be achieved before an advertiser will agree to advertise on that website. Second, once an advertiser has been retained, the amount of traffic directed to advertiser websites directly translates to how much advertisers will pay. Third and finally, for many infant websites that largely depend on user-provided content, such as discussion forums or social networking tools, it is paramount to achieve a critical mass of online traffic in an early stage in order to go forward. At these websites, the more visitors there are, the more attractive the website becomes to other visitors. For example, most new auction websites will not be able to compete successfully against eBay because it is very difficult to achieve the initial critical mass. Buyers and sellers prefer to visit eBay because it is much easier to find other buyers and sellers there. Thus, how to effectively generate, attract, and retain online traffic is a challenge faced by many websites owners and administrators.

As mentioned above, one possible approach is to build a reward system in which users collect points or other types of rewards, such as frequent flier miles, based on specifically going to advertiser websites or performing other specified on-line activities, such as making a purchase. Such systems have seen only limited success and have not gained widespread acceptance. The present inventors recognize that these systems, including the above described patent, are unpopular because they take up a participant's system resources and screen space, yet they only serve to monitor user activities and fail to provide entertainment value such as gameplay, self-expression and personalization.

The present inventors further recognize that users may reject the point-collecting experience as a monotonous chore that they must perform in order to obtain rewards. One problem is that these reward systems do not provide any entertaining experience to the users as they collect rewards. A solution recognized by the inventors, then, is to introduce amusement and entertainment into the process, so that it becomes a game, not a chore, to participate in the advertisers' activities. There are at least two ways recognized by the inventors that can achieve this objective. First, it is possible to make the rewards themselves more interesting by using Virtual Collectibles rather than the traditional point-based system. Second, it is possible to make the reward-collection process more entertaining by providing a system and method for distributing Virtual Collectibles that creates a more game-like environment and allows, and at times encourages, user interactions, communications, personalization and self-expression. It is feasible and even more effective to use both approaches. These and other features and implementations of the invention that make it superior over the prior art will now be discussed in detail.

FIGS. 1 through 4 illustrate certain broad and general aspects of Virtual Collectibles that are made possible by a system according to the present invention. As shown, each user may have (e.g. fully or partially own or control) a number of Virtual Collectibles. In this example, User 101 owns Virtual Collectibles 101 and 102, among others. User 102 owns Virtual Collectible 103, among others. As further shown, each Virtual Collectible can have a number of attributes. An attribute may determine a Virtual Collectible's appearance, behavior, who may own the Virtual Collectible, purchase price, redemption value, and other characteristics, etc. It may be helpful to think of a Virtual Collectible as a collection of attributes. The attributes of two different Virtual Collectibles may overlap. For example, Attribute 1C, which determines the exterior color, is found in both Virtual Collectibles 101 and 103. That is, the two Virtual Collectibles will share the same exterior color. Since the number of possible attributes is virtually infinite, and the number of unique combinations of attributes is also virtually infinite, there is virtually no limit to the number of possible unique Virtual Collectibles.

Allowing users to acquire virtual objects or virtual goods (i.e. Virtual Collectibles) according to the invention instead of the traditional points greatly enhances the entertainment value for a number of reasons. First, users will tend to actively seek out Virtual Collectibles with certain attributes that they desire, and to avoid attributes they do not. Moreover, because some attributes can be considered more desirable than others, users can be highly motivated to look for Virtual Collectibles with certain attributes. Other Virtual Collectibles, no matter how many, will not satisfy the user's needs. Also, unlike points, some Virtual Collectibles may be rare, or supplied in limited numbers, which makes them more valuable simply due to their rareness.

According to other aspects, the system can be made such that a combination of certain virtual objects or virtual goods (i.e. Virtual Collectibles) is particularly advantageous to possess. For example, during a certain period of time, a user with both a green Old Navy hat and a blue Banana Republic scarf is able to have his/her avatar fly instead of walk. The extra perks of having a special combination of Virtual Collectibles, or "Combos," can thus compel users to search for not one, but multiple Virtual Collectibles.

Figure 2:
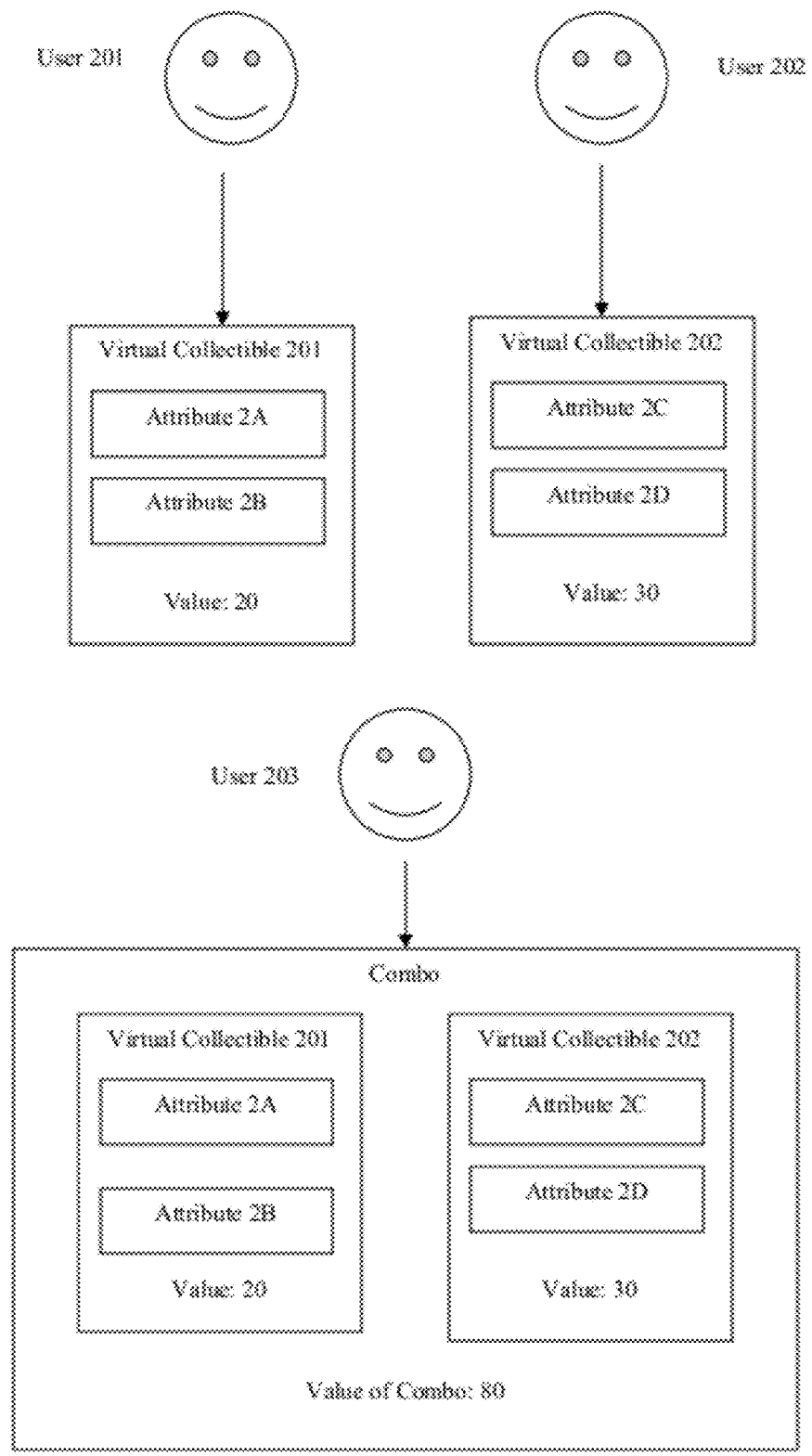
FIG. 2 is a block diagram illustrating the basic concepts of a Combo, such as a special combination of Virtual Collectibles, according to aspects of the invention.

To better illustrate the principles of a Combo, numerical values are shown being assigned to the value of each Virtual Collectible to users in FIG. 2. The numerical values can correspond to points, real or virtual currency, and many other possibilities. In any event, the higher the numerical value, the more desirable the Virtual Collectible is to users. As shown, Virtual Collectible 201 has a value of 20 when it is individually owned by User 201, and Virtual Collectible 202 has a value of 30 when individually owned by User 202. A user who owns both Virtual Collectibles would normally reap a combined value of 50 from the Virtual Collectibles. But when the two Virtual Collectibles satisfy a Combo, User 203 who owns both Virtual Collectible 201 and 202 achieves the Combo, the system can assign a heightened value to the Combo, which is 80, greater than the sum of the values of the individual Virtual Collectibles. The extra value of 30 is the bonus for achieving the Combo.

Figure 3:
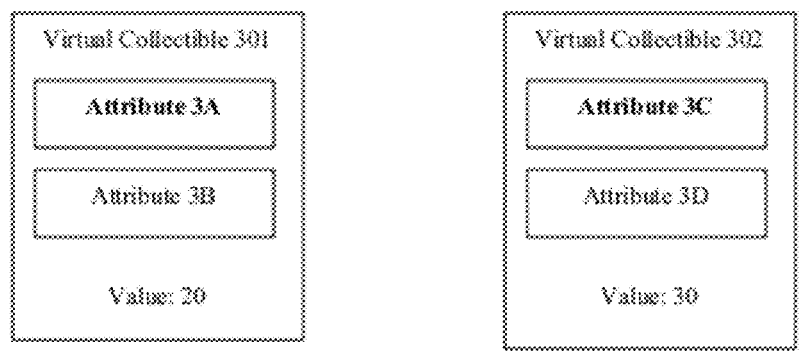
FIG. 3 is a block diagram further illustrating different ways to achieve a Combo in a rule-based system according to aspects of the invention.
Figure 3:
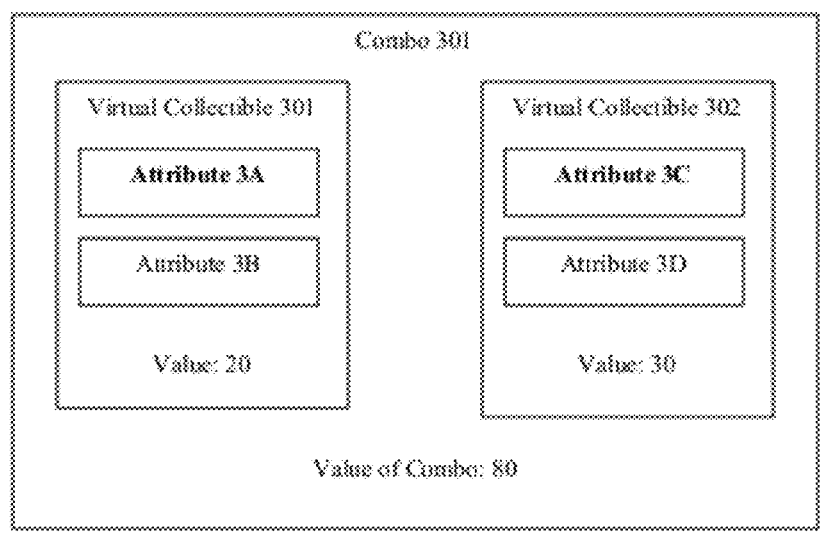
Figure 3:
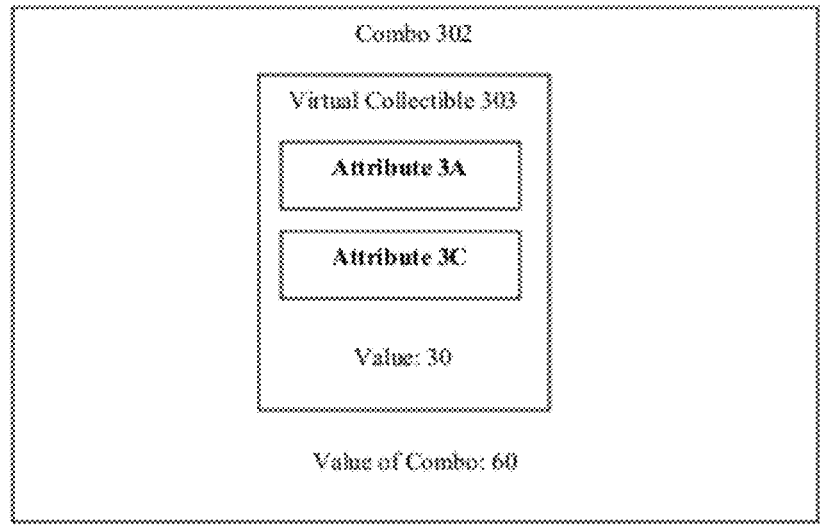

Combos do not have to be formed from more than one Virtual Collectible. A Combo can also be formed from attributes. For example, for a short period of time, users who possess a Virtual Collectible of brown color and a Virtual Collectible that is a pet can achieve a Combo and receive the increased value of the Combo. Thus, a user who finds a brown baseball glove and a virtual dog will enjoy the added advantage of a Combo. So will a user who owns just a brown dog. Such implementation allows more flexibility and creativity in how to collect Combos and can add even more entertainment to the rewards. The principles are illustrated in FIG. 3. In this case, a user possessing Attribute 3A and Attribute 3C achieves a Combo—Combo 301. Therefore, a user who has Virtual Collectible 301 with Attribute 3A and Virtual Collectible 302 with Attribute 3C achieves the combo with a bonus value of 30. On the other hand, a user can achieve the Combo and the same bonus value by merely possessing Virtual Collectible 303, which has both Attribute 3A and Attribute 3C. In this way, Combos can provide a simple gameplay mechanism that assigns value to the Virtual Collectibles within the system. Combo is just one of many game rules that can be created to give value to the Virtual Collectibles a user obtains while browsing the web.

The benefit of a unique Virtual Collectible or Combo is not limited to redemption value, trading value, or appearance. A unique Virtual Collectible or Combo can translate into a unique advantage for the owner over other users. For example, a user may use a weapon to damage another user's virtual property or virtual health. Another user may use a magic spell to counteract the effect of the weapon. A Virtual Collectible does not necessarily always produce desirable effects for its owner. A user may also be attached with an undesirable Virtual Collectible that has negative effects. For example, a user may be given a Virtual Collectible that causes the user's avatar to be chained to lead weights that restrict the user's movement, and the user must find ways to dispose of the lead weights as quickly as possible.

Another advantage of using Virtual Collectibles as rewards lies in the attractive appearance or functionality. Traditional rewards points are represented by a number. A user who collects more rewards observes nothing more than a number going up. On the other hand, each Virtual Collectible can have a unique appearance or set of attributes. The user who collects them can derive entertainment merely from looking at or possessing them.

Further, Virtual Collectibles are advantageous over traditional points because they make the users who own them appear more appealing to other users in a rule-based system. This can be achieved in a number of different ways. For example, each user may have an avatar that represents them as they navigate in the system. Each user may also own other Virtual Collectibles that accessorize the avatar, such as clothing, hats, and facial features. These Virtual Collectibles may attach to a user's avatar or may be associated with a user's profile, virtual home or virtual space. Examples include a user collecting vehicles, weapons, medicine, furniture, minigames, planets, badges, etc. Owning these Virtual Collectibles can enhance the user's status within the game or social network. By collecting highly sought-after Virtual Collectibles and displaying them for other users to see, a user can obtain recognition of achievement from the community. Highly decorative or rare Virtual Collectibles not only act as status symbols, but they can also be used to personalize the users' avatars, profiles or online virtual spaces. By displaying these Virtual Collectibles or arranging them in a unique combination, users can express and personalize their appearance, as well as decorate their virtual spaces in a pleasing manner.

Figure 4:
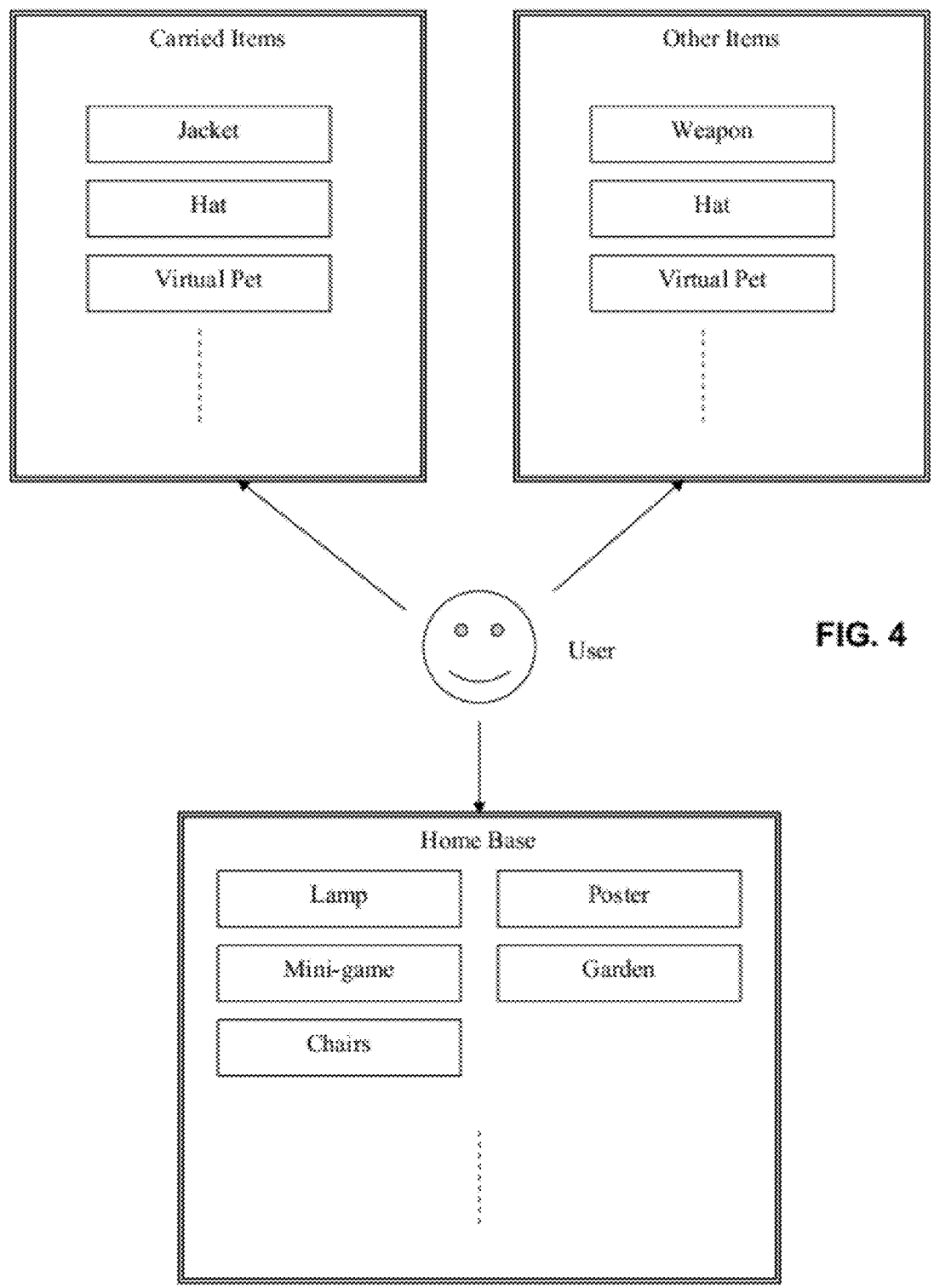
FIG. 4 is a diagram showing example categories of Virtual Collectibles a user may possess according to aspects of the invention.

Accordingly, as shown in FIG. 4, the Virtual Collectibles can be grouped by whether they are attached to an avatar, virtual home, user's profile or nothing. It should be noted that Virtual Collectibles are not limited by these example ways of being associated with a user's online identity. Rather, many other types of association between users and Virtual Collectibles possessed by users are possible.

In some embodiments of the invention, certain Virtual Collectibles can be made more difficult to obtain (e.g. rarer, harder to find, less frequently available, or more expensive), and therefore some Virtual Collectibles can be effectively more desirable than others. As a result, the invention allows control over the visual appeal and desirability of the Virtual Collectibles not only by thoughtful aesthetic design but also by controlling the scarcity of the Virtual Collectibles. Controlling the desirability of the Virtual Collectibles enables developers to enhance the entertainment value of the system, as well as enabling partners and sponsors to have a greater control over targeting audiences. For example, where a user's online identity is represented by an avatar, these may be customized by other Virtual Collectibles such as clothing, accessories, hairstyles, etc., certain or all of which can be made more appealing by being more difficult to obtain.

Moreover, in some embodiments, Virtual Collectibles can be branded and carry the logos or identifying marks of partners and sponsors. By associating Virtual Collectibles with specific marks and brands, the system can heighten user interest, foster brand recognition and loyalty, and give partners and sponsors the ability to market their products and services more directly. For example, a Virtual Collectible can bear the logo of a sponsor, such as a spaceship Virtual Collectible bearing the Ford logo. By making the Virtual Collectible visually appealing and/or difficult to obtain, greater brand recognition and loyalty can be promoted. Moreover, acquiring such a highly appealing Virtual Collectible can be tied to a sponsor's goal of promoting its products, such as making it available as a prize to one or more users for viewing a promotional video at a dedicated URL in its website.

A method and system of distributing Virtual Collectibles according to certain aspects of the invention will now be described in detail beginning with FIG. 5.

Figure 5:
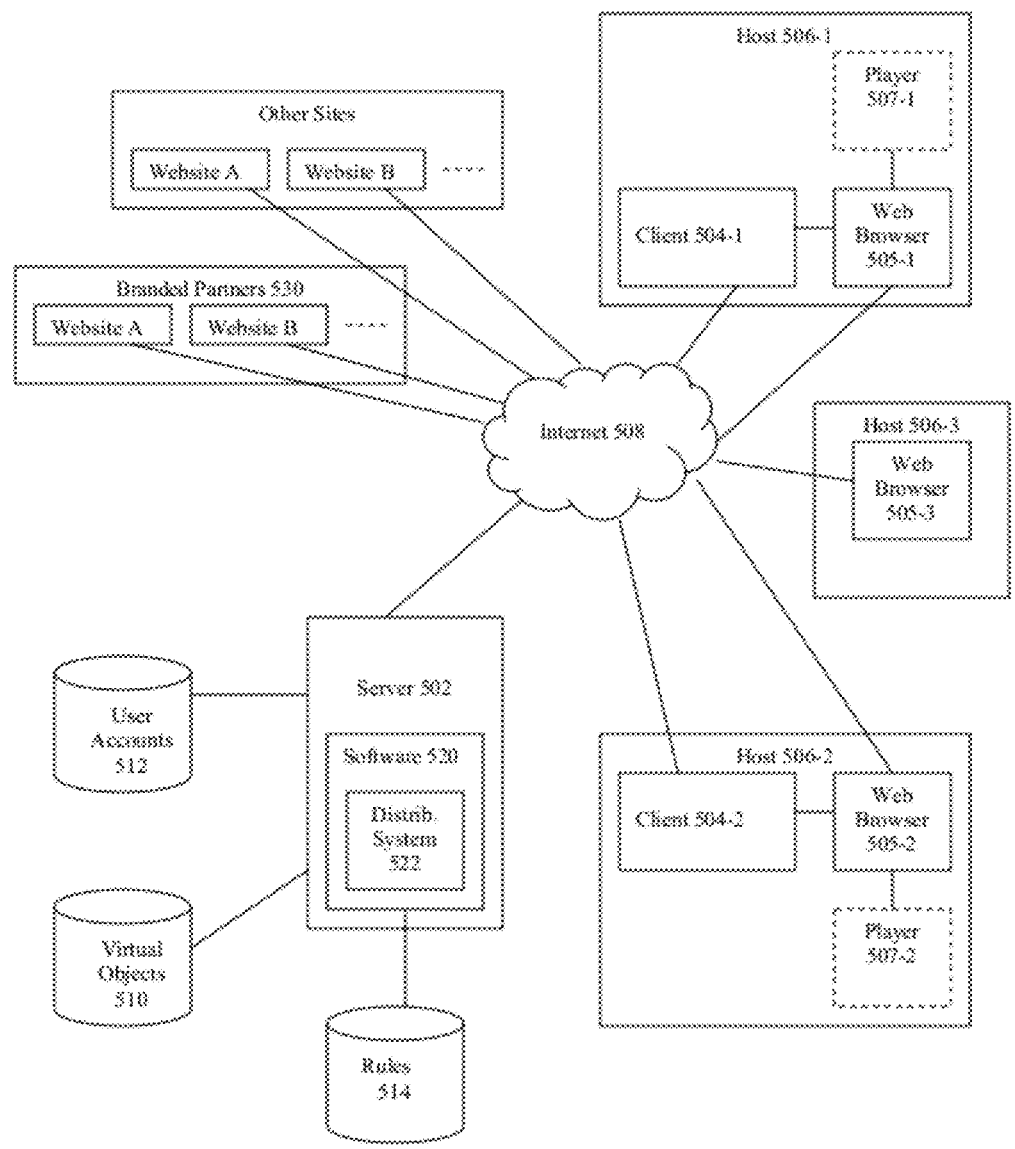
FIG. 5 is a block diagram of a Virtual Collectible Distribution Network according to aspects of the invention.

As shown in FIG. 5, a system according to the invention includes server 502 that communicates with clients 504-1, 504-2, etc. having associated hosts 506-1, 506-2, etc. via Internet 508. In embodiments, server 502 can further communicate with hosts (e.g. 506-3) that do not have clients. In general operation, server 502 controls the distribution of virtual objects to users based on user activity communicated by clients 504.

Server 502 can be implemented by one or more server computers and associated server software such as those available from Sun, HP, BEA, etc. As shown in FIG. 5, server 502 hosts and maintains a database 510 of Virtual Collectibles and database 512 of user accounts. It further includes associated software 520 comprising, for example, operating system(s), web server(s), database server(s), and other server software. According to aspects of the invention, software 520 at least includes distribution system 522 that determines how to distribute Virtual Collectibles to users, and/or control attributes thereof, based on the users' behavior and selections as communicated by clients 504 and rules 514. In embodiments, server 502 maintains a list of Virtual Collectibles belonging to individual users in user accounts database 512, and/or credits, points or other real or virtual currency that can be redeemed or exchanged for Virtual Collectibles. It should be noted that server 502 can maintain other conventional user account information such as usernames, passwords, contact information, etc., either in database 512 or other locally or remotely accessible storages. It should be further noted that the depiction of separate storage 510, 512, and 514 for Virtual Collectibles, user accounts, and rules, respectively, is intended to be representative rather than structural, and that many different forms of local, remote, online, offline, permanent and temporary types of storage are possible, either singly or in combination.

According to certain aspects of the invention to be described in more detail below, Virtual Collectibles can be distributed by server 502 to users having clients 504 based on their activity with partners 530 (e.g. www.ford.com, www-.coke.com, etc.) who each have one or more websites accessible by browsers 505. As further shown in FIG. 5, users can also access other websites in addition to partner websites 530. In embodiments, server 502 can also distribute Virtual Collectibles based on this activity, as reported by clients 504.

Hosts 506 are generally any type of computing device a person can now or in the future use to access the Internet or other public network, and which can host at least a client application 504 and Internet access hardware (not shown) and software such as a browser 505. In an example where host 506 is implemented by a personal computer such as a Mac, PC, notebook or desktop computer, host 506 typically includes an operating system such as Windows or Mac OS, a browser application such as Windows Explorer or Mozilla Firefox, and network access hardware such as a wired or wireless modem. Hosts 506 further preferably include graphical displays (e.g. one or more LCD screens) and I/O devices (e.g. keyboard, mouse, keypad, scroll wheels, microphone, speakers, video or still camera, etc.) for providing a user interface within the operating system and communicating with client application 504. Hosts 506 are not limited to personal computers, but can include cellular phones, personal digital assistants (PDAs), game systems (e.g. Playstation, Wii, Xbox, etc.) or other devices, and those skilled in the art will understand how implementation details can be changed based on the particular type of host device.

Clients 504 are software applications that reside on the hosts and typically execute under the host operating system. The client software application 504 can be either a standalone application, such as a game interface that occupies a large portion of the computer screen when in use, a plug-in that is embedded into another application such as a web browser and occupies very little screen space, or other type of application and/or screen configuration. In general operation to be described below in more detail, the client application monitors the user's on-line behavior, such as the URLs that the user is visiting via browser 505. It sends this information over the Internet to the server, which in turn uses it to makes decisions as to whether to make one or more Virtual Collectibles available to the user based on the behavior.

The client application 504 also preferably provides a graphical interface using the display and I/O devices of host 506 by which the user navigates through, and interacts with other users in, a virtual world. As will be described in more detail below, the user may initiate an event requiring server attention, such as a trade request, from the interface. The user may also interact with other users using chat and other conventional and new online communication mechanisms, including but not limited to voice and video communications, hosted by server 502 and within or without the graphical interface provided by the client application. In embodiments, the graphical interface provides a graphical representation of other users in the form of avatars, and can also display the Virtual Collectibles that the user or other users own, either alone or together with their respective avatars. The various attributes of a Virtual Collectible control how it is to be displayed by the client application 504, thus giving a distinctive look and feel to unique Virtual Collectibles.

In one example implementation shown in FIG. 5, where host 506 is a laptop or desktop personal computer, client application 504 is an ActiveX control that operates with browser 505, and has at least the functionality described above, and to be described in more detail below. Host 506 further includes an optional multimedia player 507 such as a Flash Player for use in displaying multimedia content provided by the invention in a multimedia interface. Those skilled in the art will understand how to implement the principles of the invention using such conventional mechanisms after being taught by the below detailed descriptions of the functionality provided by server 502 and client 504.

Internet 508 is, for example, the public Internet, but can further or alternatively include any combination of wired and wireless networks, public and private, that are traversed by users who seek access to content on the public Internet, as will be appreciated by those skilled in the art.

It should be noted that the configuration illustrated in FIG. 5 is intended to be illustrative and not limiting, and those skilled in the art will appreciate various alternative configurations, topologies, etc. For example, while only one server 502 is shown, there may be many servers 502, either in the same location and/or at the same network address, and/or distributed across many locations and/or network addresses. Many other alternatives are possible, as will become apparent to those skilled in the art.

Figure 6:
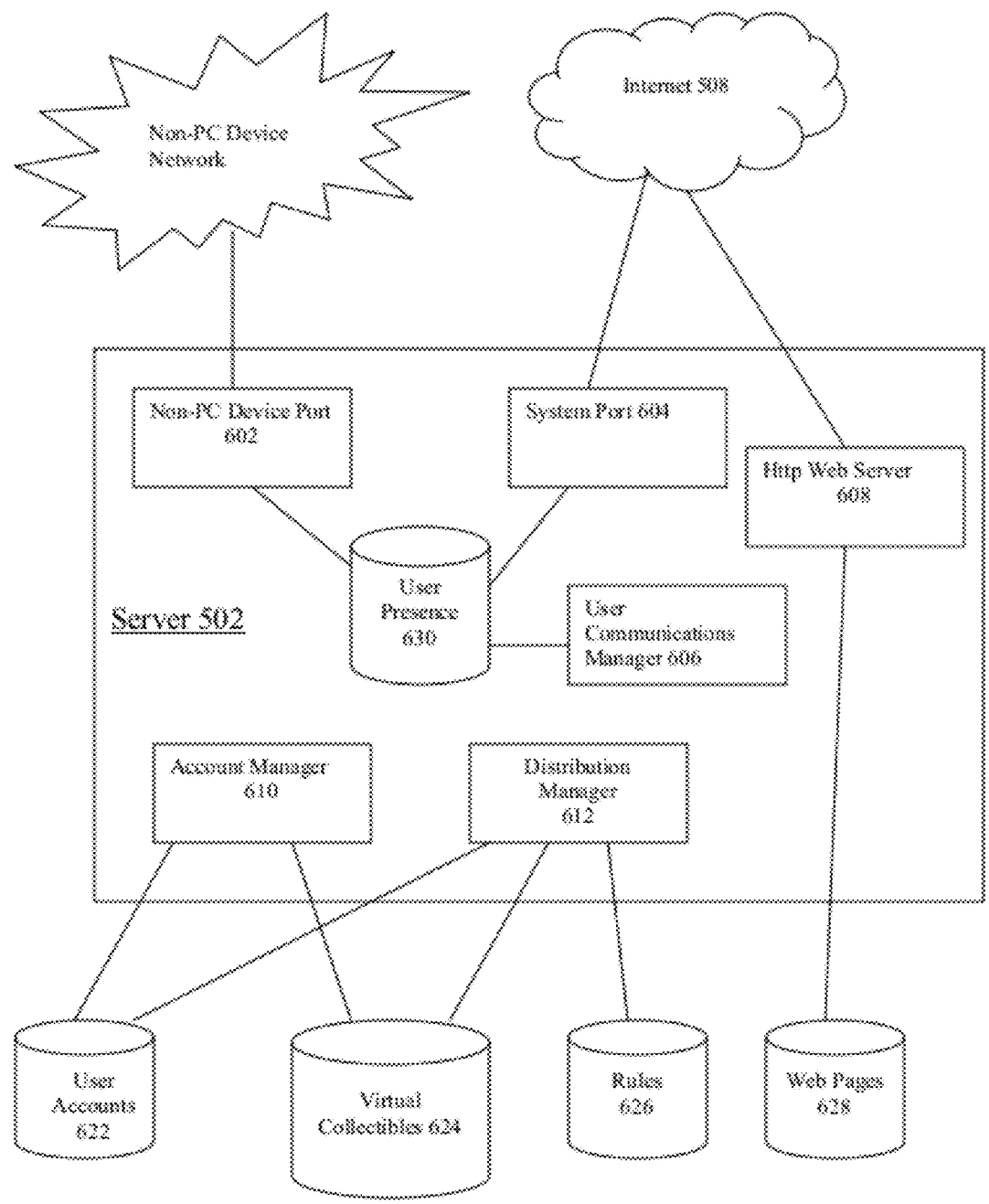
FIG. 6 is a detailed block diagram of an example implementation of a server in a Virtual Collectible Distribution Network according to aspects of the invention.

An example implementation of server 502 is illustrated in further detail in FIG. 6. As shown in FIG. 6, server 502 includes Non-PC device port 602, system port 604, user communications manager 606, http web server 608, account manager 610, distribution manager 612, and user presence 630. Some or all of processes 602, 604, 606, 608, 610 and 612, as well as presence storage 630 communicate with each other over a bus or network (not shown). As further shown in FIG. 6, server 502 can include one or more processes for managing structured or unstructured data including user accounts 622, virtual collectibles 624, rules 626, and web pages 628. In one example implementation, data 622, 624, 626 and 628 are provided in one or more common or separate databases that can be either internally or externally stored. It should be noted that storage 630 is shown as provided within server 502 to illustrate a typical configuration where such information is dynamically maintained and used by one or more processes 602, 604, 606, 608, 610 and 612 but is not permanently recorded. However, this is just one example, and certain or all of such information can also or alternatively be maintained in internal or external storage that is more persistent.

In general, communications between server 502 and clients 504 are handled by non-PC device port 602 and system port 604. In general, system port 604 handles communications with clients 504 hosted on devices such as PCs. The non-PC device port 602 handles communications with clients 504 hosted on devices such as cell phones and PDAs. It should be apparent that these need not be separate processes, but can be provided together in alternative embodiments. In general, ports 602 and 604 operate to communicate with clients 504 using structured messaging as defined for the appropriate client type, allowing for interaction with server 502 in order to provide access to users' accounts 622 and award Virtual Collectibles 624 according to rules 626. In one PC example, clients 504 use http methods such as the POST method over TCP/IP and sockets to send information about URLs browsed by web browser 505 to server 502 via port 604. These and other example implementation details will be described and/or become apparent to those skilled in the art based on the following descriptions.

Typically, device port 602 and system port 604 handle user interactions with server 502 via a user interface provided by the respective clients 504 (e.g. mouse clicks by users in graphical displays rendered by client applications 504, provision of content to clients 504 for rendering on the host display, etc.) Ports 602 and 604 also handle communications from clients 504 that are not directly initiated by and/or visible to users. For example, when a user visits a website, this information is captured by client applications 504 and sent to server 502 via ports 602 and 604, without awareness and/or action by users of host devices 506.

As shown, in embodiments, server 502 further includes http server 608, which is able to interact with web browsers in a conventional manner, for example to serve web pages and other content. Such browsers can include browsers 505 in hosts 506, or in other user computers that do not have clients 504. These pages can facilitate new user registrations, user log-ins, user account management, etc. It should be apparent that http server 608 can serve http requests either through a dedicated web address (e.g. www.rocketon.com), or indirectly through re-directs, links and other mechanisms.

Http server 608 accesses stored and other content from pages 628. Pages 628 typically include web page content in the form of HTML, XML, etc., but can further include templates, JSP's, ASP's, servlets, etc., as will be appreciated by those skilled in the art. Moreover, although pages 628 is shown as being only accessed by http server 608, certain of the same or other content can be accessed and/or used by other processes in server 502. For example, account manager 610 and ports 602, 604 can use pre-defined content and templates in pages 628 for serving pages that display account information to users. Other examples and types of content stored in pages 628 and used by server 502 processes in connection with server-client interactions will become even more apparent in connection with descriptions of certain implementations below.

User communications manager 606 manages sessions and interactions between users having clients 504. For example, manager 606 maintains text chat sessions between several users who may be graphically and textually interacting with each other in a Virtual Space (e.g. chat room) via avatars, etc. It should be apparent that there can be many Virtual Spaces that are active in the system at any given time, with many users participating in each. In operation, clients 504 capture text, mouse clicks and other communications from users interacting with chat controls provided by clients 504 and send this information to server 502 and ports 602, 604. User communications manager 606 manages the relay of such communications to the intended other users via their respective clients 504 and ports 602, 604. Those skilled in the art will be able to understand how to implement manager 606 art after being taught by the present specification.

As further shown in FIG. 6, user presence information 630 (i.e. whether users are currently on-line and/or available for communications, what web site they are currently visiting, etc.) is dynamically maintained based on user interactions with server 502 via ports 602, 604. Manager 606 accesses this information, and may further maintain other user interaction information such as current active virtual spaces and chat session information, in storage 630 in connection with these user interactions. It should be appreciated that processes in server 502 other than module 606 can also access and/or maintain information in storage 630. It should be further noted that the invention is not limited to providing text conversations between users, but that conversations can include video, audio and other network communications functionality, provided either within server 502, or using other functionality outside server 502.

In general, server 502 processes information from ports 602 and 604 using processes 610 and 612 to determine whether and how to award, remove or change Virtual Collectibles possessed by users based on such information.

For example, in embodiments, account manager 610 allows users to view and edit their account information and view Virtual Collectibles and corresponding attributes, including those that they already possess or wish to possess, using information stored in accounts 622. Account manager 610 further allows users to browse, search, view and buy Virtual Collectibles from the system using money or points, or redeem Virtual Collectibles and/or points for money (real or virtual). Information regarding available Virtual Collectibles, their available attributes and corresponding values are stored in 624. Account manager 610 also allows other server processes to access this information. Account manager 610 further manages trades of Virtual Collectibles between users using information from stores 622 and 624. In embodiments, account manager 610 can further include or interact with an online billing or payment system or gateway (e.g. PayPal) for handling purchases or redemptions using credit or debit cards.

In embodiments, distribution manager 612 determines how and when to make new Virtual Collectibles available to users. Distribution manager 612 accesses rules 626 to make its determinations. For example, as shown in Table 1 below, rules 626 can provide a list of URLs, and Virtual Collectibles corresponding to the URLs, as well as criteria about how the corresponding Virtual Collectibles can be made available to users. Accordingly, when a user having a client 504 visits a website, the URL is sent to server 502. Manager 612 determines whether the URL is listed in rules 626, and if so, manager 612 can further determine whether criteria associated with the URL are met (for example, whether the user is one of the first 20 users to visit the page corresponding to the URL).

TABLE 1

| Rule | URL | Virtual Collectible | Criteria |
|---|---|---|---|
| 1 | www.ford.com | Ford spaceship | First 10 visitors |
| 2 | www.gap.com | Avatar headband | All visitors on January 25 |
| ... | ... | ... | ... |
| N | www.coke.com | Blue Yeti | Random visitors |

In an example where rules are based on URLs visited by users, these URLs can contain wild cards to accommodate random-generated and ranges of URLs. For example, an entry may exist in the pool where "www.amazon.com/userid=*/shop.php," where the asterisk can be replaced by any string. This eliminates the need to store thousands of similar URLs.

Conversely, certain Virtual Collectibles can be tied to specific URLs (e.g. the specific URL of a video clip providing a demonstration of or advertisement for a partner's product). Accordingly, the system can reward visitation to a specific URL by creating a rule in rules 626 that associates only one specific URL with that Virtual Collectible. Because these Virtual Collectibles can be made unique, the Virtual Collectibles that a user collects from one URL cannot necessarily be found by visiting any other URL. This provides the user with more incentive to visit a specific URL, and allows the user to be entertained when an appealing Virtual Collectible is made available based on that visit.

It should be noted that rules 626 can further specify what should happen if a corresponding URL is not found in a list such as Table 1. There are numerous possibilities as to what may happen: no Virtual Collectible may be distributed, a Virtual Collectible may be distributed one out of five times, or some other distribution rule may apply.

In embodiments, server 502 can conduct games using Virtual Collectibles, distribution manager 612 and criteria set in rules 626. For example, the system can track how many points certain groups of users accumulate (e.g. points associated with Virtual Collectibles distributed to users) over a certain time period and award an additional prize to the user who accumulates the most points. As another example, server 502 can declare a Combo of Virtual Collectibles that has a certain elevated point value for a limited time, and award those elevated point values during that limited time. It should be apparent that distribution manager 612 can therefore include local or remote memory (not shown) for storing information regarding current and past games, as well as the rules for these games, to the extent they are not controlled by rules and criteria in storage 626.

In embodiments, Virtual Collectibles are stored in database 624 as pointers to one or more objects that may contain animations, sound, graphics and specific functionality within a game or rules-based system. Virtual Collectibles can be as simple as graphics files. For example, a Virtual Collectible could be a .GIF, .JPG, .BMP or .PNG file corresponding to a static image when rendered on a host computer. Virtual Collectibles can further or alternatively include an animation file, such as an animated .GIF file or a Flash animation. Virtual Collectibles can also further or alternatively include any sort of media file, including any type of audio or movie file, such as MP3, .AVI, .SWF, .MPG, WMV, .WAV, etc. In such cases, content associated with Virtual Collectibles can typically be downloaded or streamed to users via ports 602, 604 and clients 504 via conventional protocols such as http and rendered on hosts using conventional browser functionality and/or functionality in optional multimedia players such as Flash.

It should be noted that Virtual Collectibles can also be as sophisticated as a programmable bot or application, such as a trivia game, mini-game, interactive pet, or bot endowed with artificial intelligence. In this case, the Virtual Collectibles may come with a client-server architecture of their own included in, or in addition to ports 602, 604, or they may plug into the client-server framework of a larger game or application provided in server 502 and/or downloaded to client 504. For example, the Virtual Collectible could include a Flash game or a Java game, or a Java servlet, or a C++ game, or an Active X control, etc.

In many of the examples provided above, the user could further be able to customize the Virtual Collectibles. For example, the user might be able to change the color of a piece of virtual clothing, or the design of a virtual car, or the music playing in a virtual boom box. In all of the above examples, the Virtual Collectible may be used by the client 504 as part of a larger game or an application.

It should be noted that in addition to storing data corresponding to a graphical representation of Virtual Collectibles and attributes affecting their appearance (e.g. selected color), other attribute information can be stored in database 624. For example, information such as purchase value, redemption value, special abilities, bonus points, etc. can be stored in database 624 and associated with each Virtual Collectible.

It should be noted that server 502 preferably includes an administrator interface (not shown) and associated functionality to manage various aspects and operations of the system. For example, server 502 can allow an administrator to upload and change Virtual Collectibles, their attributes, and rules for distribution, including creating and initiating games to be played by users with clients 504. Server 502 can further allow an administrator to change and configure web pages and other content served by the http server.

It should be further noted that in alternative embodiments server 502 need not include all the components and functionality shown in FIG. 6, or can include other server and/or network components and functionality not shown in FIG. 6, such as load balancers, firewalls, switches, gateways, etc. Moreover, those skilled in the art will appreciate that server 502 and/or certain or all of the components shown in FIG. 6 can be implemented by several different computers, either locally or remotely located, and communicating with each other via a bus, network, etc.

Figure 7:
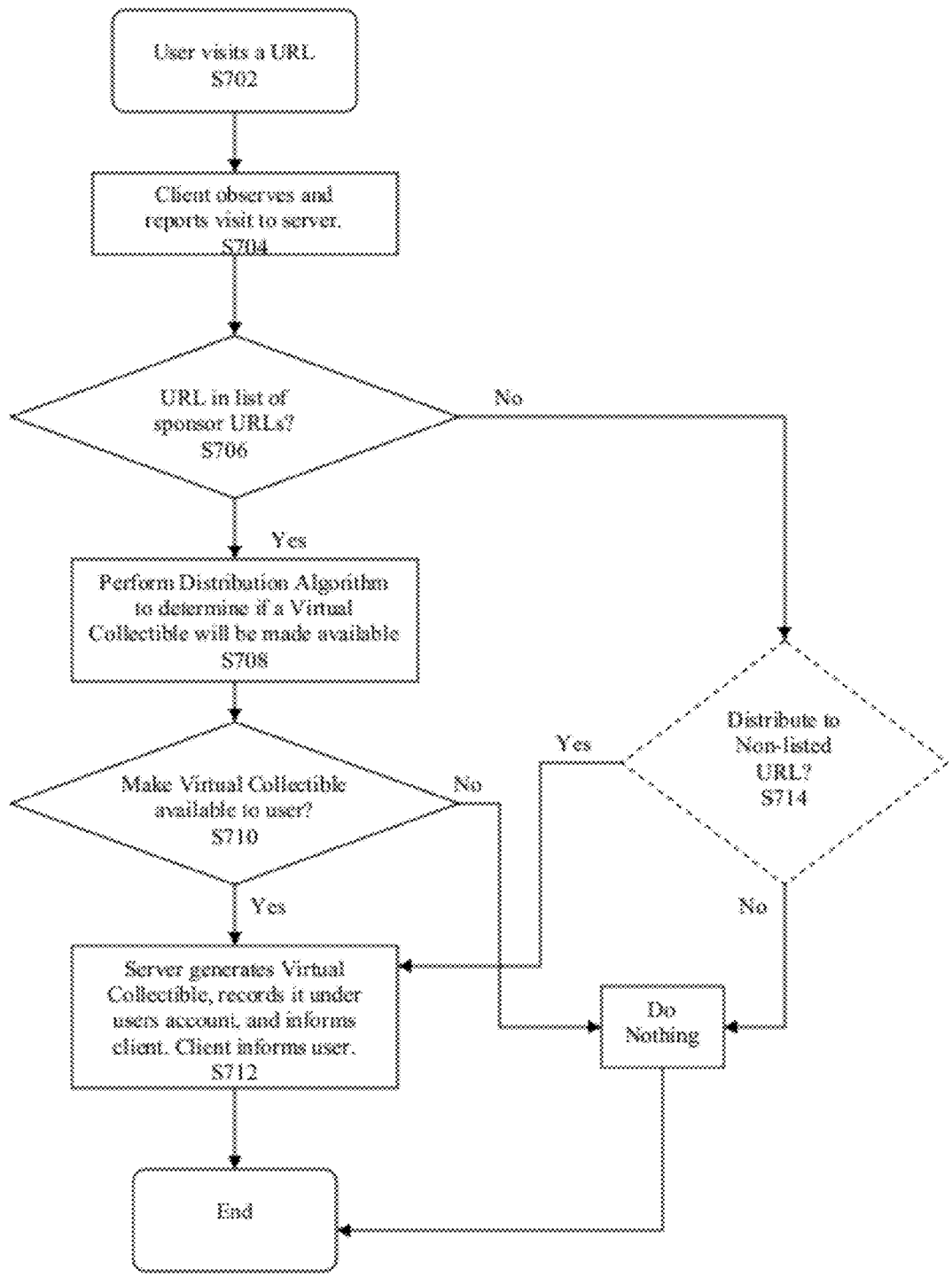
FIG. 7 is a flowchart illustrating an example method for distributing Virtual Collectibles that can be implemented in a system according to aspects of the invention.

FIG. 7 is a flowchart showing an example process that can be implemented by server 502 to provide a new or changed Virtual Collectible to a user.

As shown in FIG. 7, in step S702 a user surfs the web as usual. In step S704, when a user visits a new URL, the client 504 notes this activity and transmits this information to the server 502. For example, client 504 can monitor whenever a new URL is typed into browser 505, or when a link to a URL having a different domain name than the current page is clicked. The client 504 may also maintain a memory of the last known URL visited and use that to compare to the new URL. The new URL is transmitted by client 504, along with other information such as the user's identity, to port 602 or 604 (depending on the type of host 506) using http methods and TCP sockets, for example. It should be appreciated that this communication can take place without the user's awareness.

In step S706, manager 612 of server 502 compares the URL against its list of rules in 626 to look for a match. If there is a match, processing advances to step S708 where the server reviews the criteria in the matching rule to determine what, if any, Virtual Collectible will be made available to the user. The criteria can include a variety of parameters that the distribution manager can check, such as time of day, number of Virtual Collectibles already distributed for the URL, whether a random number generated for this requests indicates a match, etc. Manager 612 can further retrieve and consult the user's own account information in 624 to determine whether the criteria are met. If manager 612 in step S708 determines that the criteria for the associated rule indicate that a Virtual Collectible can be made available to the user, processing advances to step S710.

In step S710, manager 612 retrieves information regarding the associated Virtual Collectible from store 624, and further associates this information in the account for the user in store 622. For example, where the Virtual Collectible is stored as an object in database 624, manager 612 can add a pointer or object ID index to a list of Virtual Collectibles in the user's account information in database 622.

Server 502 (e.g. through port 602 or 604) then communicates with client 504 to present the user with the Virtual Collectible and/or the option to accept or reject it. For example, server 502 can send data, text and/or multimedia content to client 504 and client 504 can correspondingly present a message on the host device's output component, such as a computer screen or a cell phone screen, or provide another indicator (e.g. a tone or buzz) indicating that a new Virtual Collectible is available for the user. Note that in some embodiments, the user need not immediately view the Virtual Collectible, although typically the user will want to view the Virtual Collectible, which can be done either automatically, or in response to a user selection such as a mouse click.

The actual processes and mechanisms that are used to enable a user to view and or perceive the Virtual Collectible awarded to the user can depend on the type of Virtual Collectible. For example, where the Virtual Collectible is a simple graphical image such as a .GIF, .JPG, .BMP or .PNG file, they can typically be downloaded or streamed to users via ports 602, 604 and to clients 504 via conventional protocols such as http and rendered on hosts using conventional browser functionality or an application running on the host computer. Where Virtual Collectibles can further or alternatively include an animation file, such as an animated .GIF file or a Flash animation, or any sort of media file, including any type of audio or movie file, such as MP3, .AVI, .SWF, .MPG, WMV, .WAV, etc., they can be rendered on a user's computer using functionality provided by client 504 and/or optional multimedia players 507 such as Flash.

Returning to S706, as shown in FIG. 7, in some embodiments, even when a URL visited by the user is not included in a list of URLs, optional additional processing may be performed in step S714 to determine whether a Virtual Collectible should still be provided to the user. For example, a random number generator can be used to determine whether the user should receive a random or predetermined Virtual Collectible from a general pool of Virtual Collectibles. If so, processing advances to step S710, as described above.

It should be apparent that the invention thus enables users to be entertained by receiving a Virtual Collectible merely by surfing the web at their own leisure. Moreover, companies associated with the pages visited by the user, and for which the user received a Virtual Collectible, can be positively remembered by the user. Still further, based on the experience of receiving a Virtual Collectible at the company's web site, the user may be more inclined to purchase goods or services from the company.

It should be noted that, although one aspect of the invention is that it allows users to receive Virtual Collectibles while they surf the web casually, the system can alternatively or additionally provide information to users that allow users to actively find Virtual Collectibles at a given site. For example, the system can provide a list of sites that currently have Virtual Collectibles available at one or more of its pages, or can send messages, hints (e.g. for a treasure hunt game) or other alerts regarding a temporary availability of a particular Virtual Collectible at a particular address.

It should be further noted, however, that the invention is not limited to allowing users to receive Virtual Collectibles from the system and possess them in a collection and/or redeem them for points or real or virtual currency. For example, the invention allows users to interact with each other, and to display, use or trade their Virtual Collectibles in the process, further enhancing the value and appeal of their Virtual Collectibles. This enhances the entertainment value of the Virtual Collectibles, thereby further driving their appeal, and users' use of the system.

According to certain aspects of the invention, because Virtual Collectibles are distinct from one another, users will have an incentive to trade them. For example, if user A has three suits of armor, but no sword, and if user A meets user B who has two swords, but no armor, they will have a reason to want to meet, communicate and/or discuss a possible trade. This incentive to trade can be further enhanced by the introduction of Combos. As discussed above, users who achieve Combos can be awarded with special bonuses and/or higher redemption values. A Combo often requires a unique combination of various Virtual Collectibles. In addition, certain aspects of the invention allow for establishing various rules associated with the Combo mechanism. For example, different users can try to achieve different Combo goals, and so the same Virtual Collectible can be worth more to one user than another. This disparity of values can serve as motivation for users to interact with one another and attempt to trade using functionality provided by user communications manager 606. Those users who acutely observe the demands, correctly make the calculations, and actively engage other users to initiate trades will be awarded by the Combos they achieve.

It should be noted that the invention can allow users to interact in other ways besides trades and text and other communications. For example, a user may have a Virtual Collectible that allows his avatar to fire a weapon at another user's avatar, causing damage to the user's avatar or his Virtual Collectibles. Users may also cooperate with one another in completing a task or a mini-game, or share pictures or other digital content.

In embodiments, users may interact with each other through chatting in on-line rooms hosted by communications module 606. The on-line rooms can be presented as Virtual Spaces, such as planets, rooms, buildings, etc., using content stored in web pages 628, for example. These Virtual Spaces can be tied to a website or can be the user's own personal home space, for example. The invention can further enable the Virtual Spaces to be a chat room presented via a multimedia interface (e.g. content rendered by a multimedia player 507 such as a Flash player) so that it approximates 2D, 2.5D or 3D space that an avatar can navigate through. The invention also includes any online environment that can present a Virtual Space. In other words, a web page the user is viewing may turn into a Virtual Space by placing the avatar on top and allowing the avatar to navigate through the 2D space.

In embodiments, as users chat and/or interact with each other in a Virtual Space, they are able to see each others' avatars and/or any Virtual Collectibles that are carried with the avatars and/or associated with the Virtual Space or associated with some storage method established for the user's account. The invention can further allow users to customize a Virtual Space, their own home space, as well as their avatars. For example, backgrounds for a user's Virtual Space can be selected from a pool of background art assets and/or personalized by adding Virtual Collectibles that decorate the Virtual Space.

The above and additional aspects and features of the invention will become apparent with respect to an example implementation described in connection with FIGS. 8-23. It should be apparent that the invention is not limited to these examples, and that many changes in appearance and functionality within this example implementation are possible. For example, based on the following examples, those skilled in the art will understand how to implement the principles of the invention using client applications including ActiveX controls, Java and Adobe Flash running on a Windows PC and having an Internet browser, as well as servers and protocols such as Ajax, PHP, etc. However, the invention is not limited to these example implementations, and those skilled in the art will further understand how to extend the invention to other platforms, protocols, client and server applications, etc.

Figure 8:
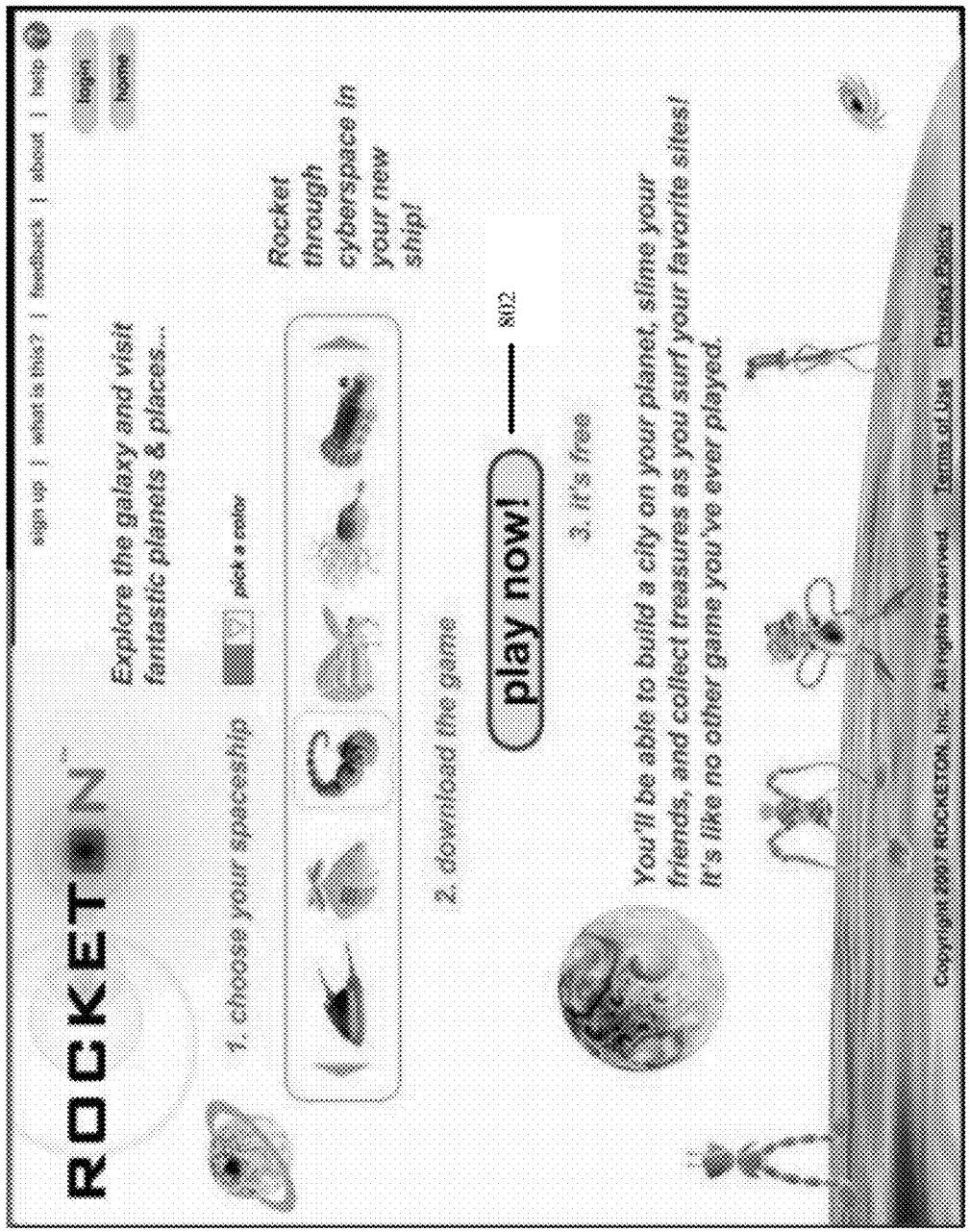
FIGS. 8 to 23 are screenshots illustrating an example implementation of various functionalities for distributing Virtual Collectibles within a conventional web browsing environment according to aspects of the invention.

FIG. 8 is a screenshot illustrating a home page that can be hosted and served to users via the public Internet by a system according to the invention, such as server 502. As shown, the home page includes a control 802 and associated message that invites users to participate in the system. In one example, when a user clicks on control 802 they are provided with one or more subsequent pages to allow them to become registered with the system, for example by providing personal information such as name, username, password, and email address. Such information can be used to create a user account for the user, which can be stored in a database such as accounts database 512.

Figure 9:
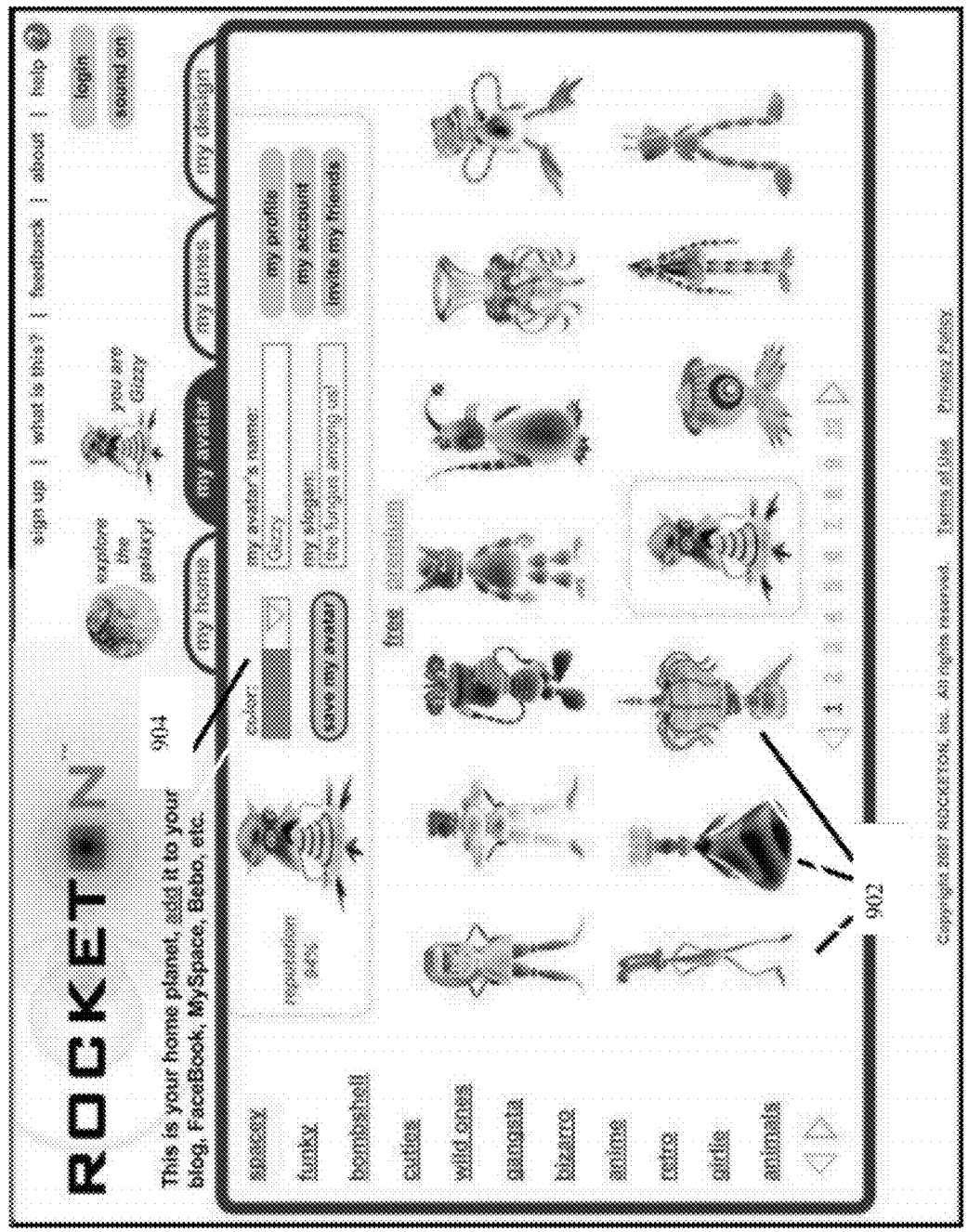

FIG. 9 is a screenshot illustrating avatars that can be provided to, and customized by, users. Avatars can be considered one example of a Virtual Collectible distributed by a system of the invention. As shown in the example implementation of FIG. 9, users can select from one of a plurality of avatar types 902, and then to select a color theme 904 (e.g. color attribute) for a selected avatar type. Further options can be provided to allow a user to customize the appearance, clothes, and accessories, respectively, of the selected avatar.

Figure 10:
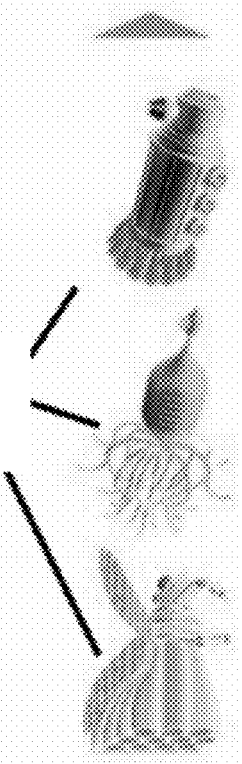
Figure 10:
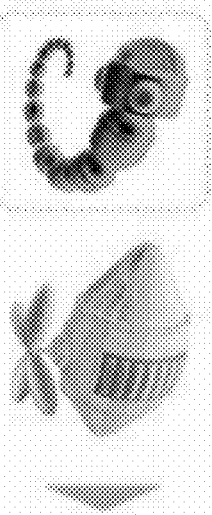
Figure 10:
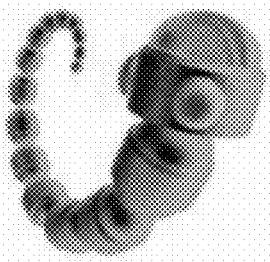
Figure 10:
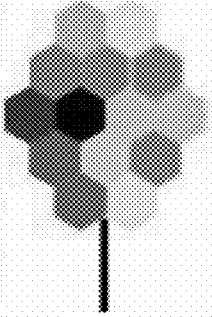

FIG. 10 is a screenshot illustrating a spaceship that can be provided to, and customized by, users in some embodiments of the invention, in addition to avatars. Spaceships can be considered another example of a Virtual Collectible distributed by a system of the invention. As shown in the example implementation of FIG. 10, users can select from one of a plurality of spaceship types 1002, and then can select a color theme 1004 (e.g. color attribute) for a selected spaceship type. As shown in the example of FIG. 10, each spaceship type has certain pre-configured attributes that cannot be changed by the user. More particularly, the "Silver Worm" spaceship shown in FIG. 10 has a special ability to slip through worm holes when being chased.

Figure 11:
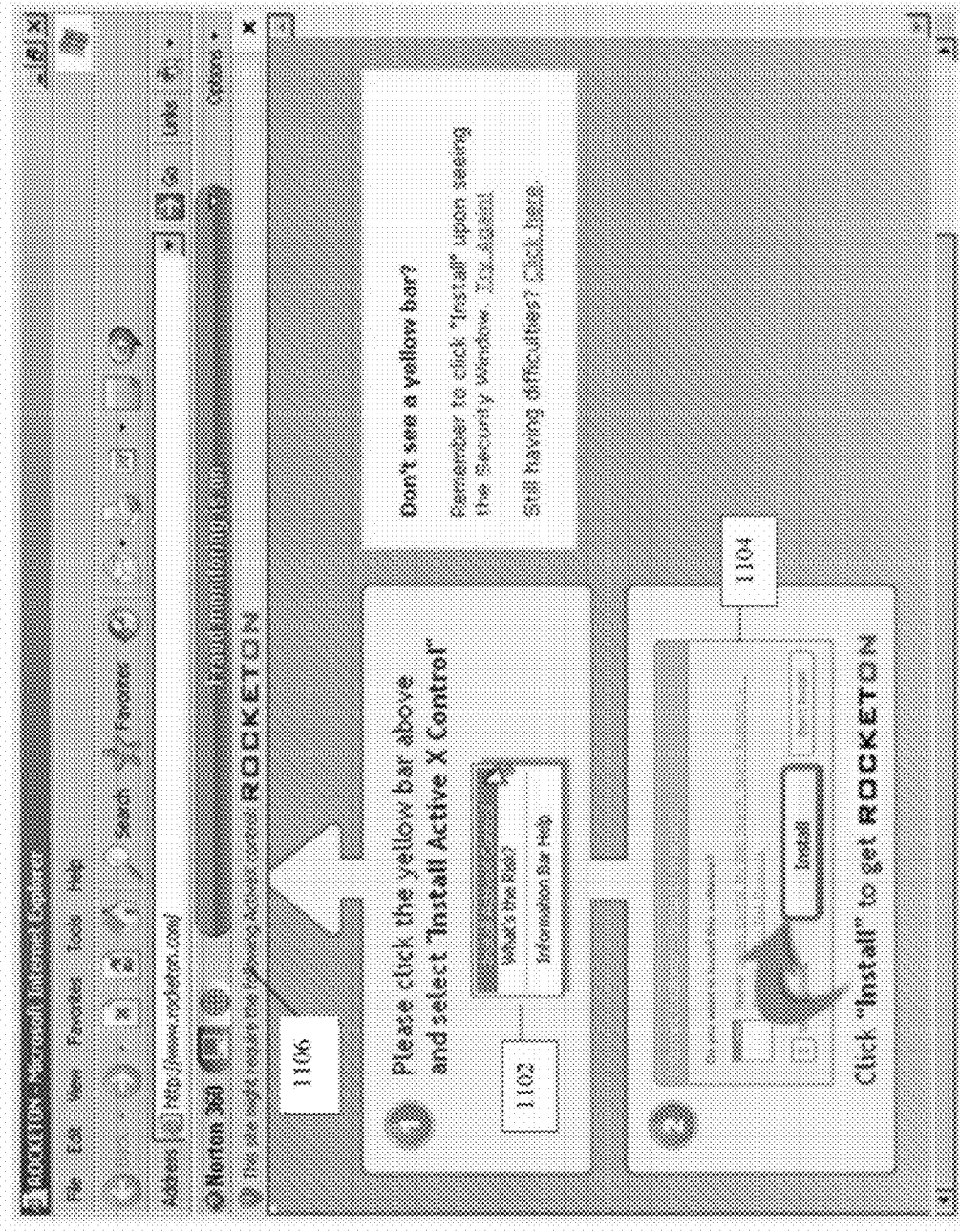

FIG. 11 is a screenshot illustrating how a client application (e.g. client 504) is provided to users in one example implementation of a host computer such as a personal computer having a web browser such as Internet Explorer. As shown in this example implementation, the client application includes an ActiveX control that implements a plug-in application for the Internet Explorer browser. For example, after a user registers with the system, the system attempts to download the ActiveX control to the user's host computer, and further displays the page shown in FIG. 11. As shown in FIG. 11, in Internet Explorer, the attempt to download the plug-in client application will cause a message 1106 to be displayed in Internet Explorer. If the user must click on the bar containing message 1106, a scroll list is presented as shown in box 1102. If the user clicks "Install" in the scroll list, a further dialog box and button will be displayed, as shown in box 1104. When the user clicks the button, the client plug-in application will be installed in the host computer.

Figure 12:
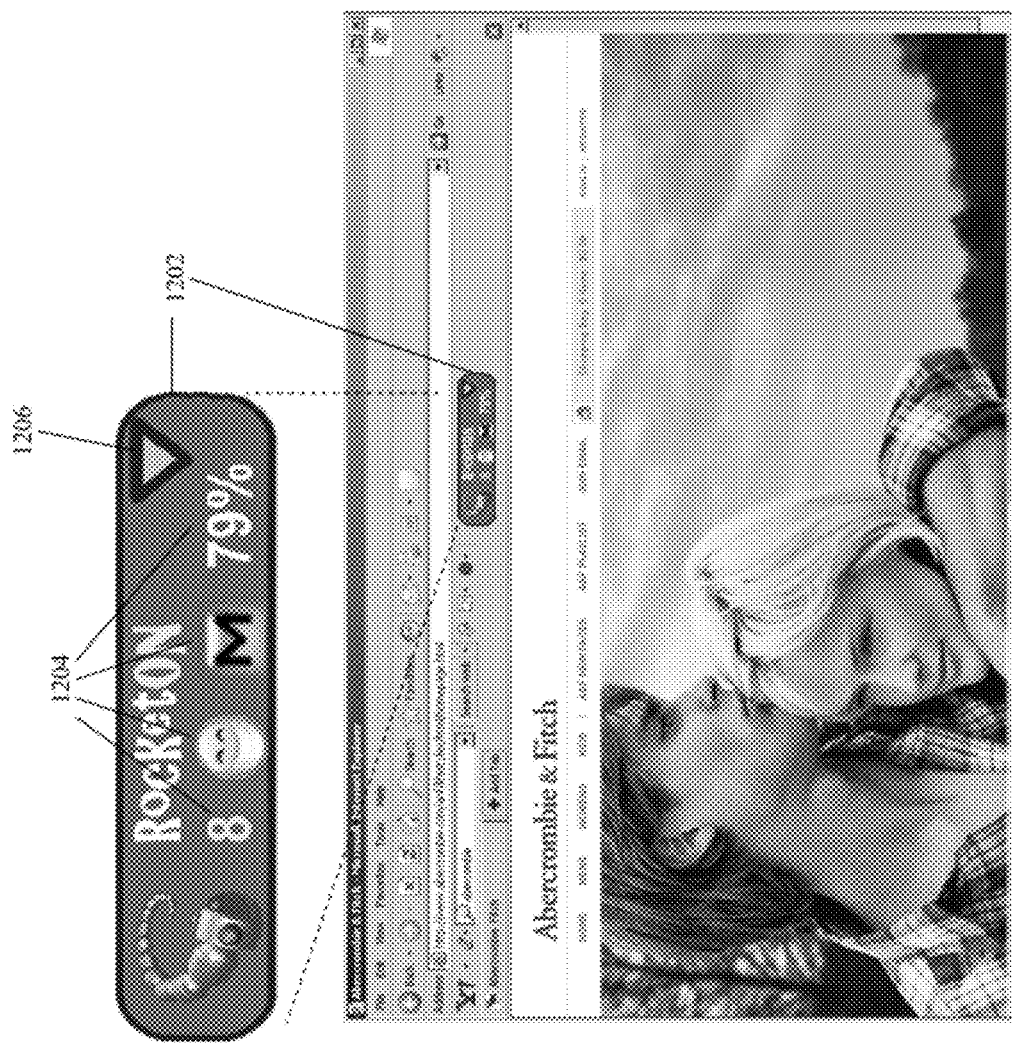

FIG. 12 is a screenshot illustrating one example of how a client application (e.g. client 504) is made accessible to users after it has been downloaded to a host computer such as a personal computer having a web browser such as Internet Explorer. As shown in this example implementation, the client application causes tray 1202 to be displayed in the toolbar of Internet Explorer while the user is surfing the web using Internet Explorer. In embodiments, if the user clicks on the tray 1202, a full screen graphical interface will be displayed, as will be described in further detail below. Otherwise, tray 1202 is displayed, and in embodiments it can include several graphical indicators 1204, including an image of the user's spaceship, an indication of the user's IM/chat presence and/or if any other users are attempting to contact the user, an indication whether the user has any new email messages, and an indication of how full of Virtual Collectibles the user's spaceship is. Tray 1202 can further include 1206, which when clicked can cause a drop-down menu to appear, giving the user access to features of the system, including those to be described in more detail below.

Figure 13:
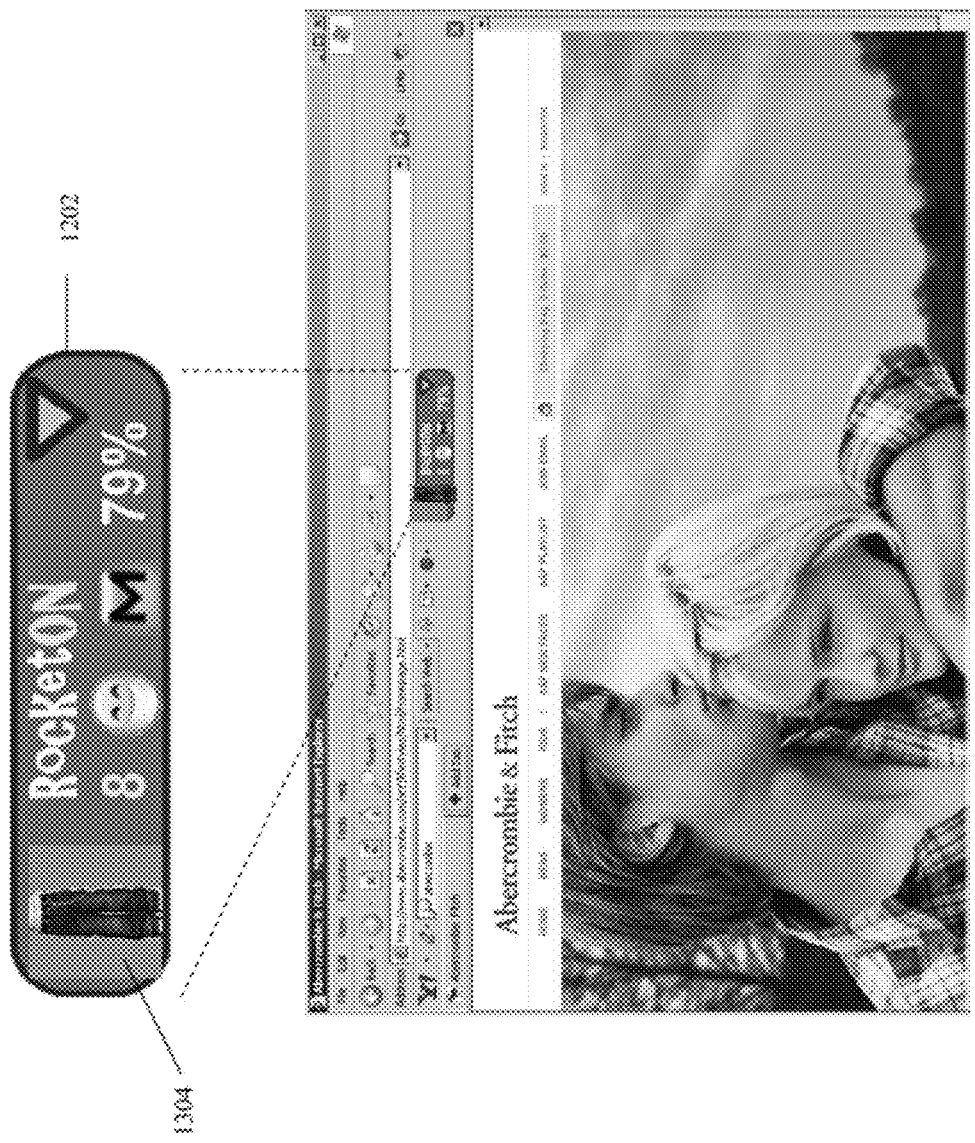

FIG. 13 is a screenshot illustrating one example of how a client application (e.g. client 504) can notify a user that a Virtual Collectible is being made available by the system of the invention while the user is surfing the web via a web browser such as Internet Explorer. As shown in this example implementation, the client application causes the contents of tray 1202 to be changed so as to replace the user's spaceship with a minimized image 1304 of the Virtual Collectible. The client application can also alert the users in other ways, such as configuring the minimized image 1304 to blink, and/or let an audible tone to sound on the user's host computer.

According to aspects of the invention described above, in addition to possibly having redemption value (e.g. for real or virtual currency), Virtual Collectibles can have entertainment value in and of themselves, thus providing users with an incentive to obtain them. Accordingly, as shown in FIG. 13, the Virtual Collectible is a pair of baggy jeans that the user can use to dress his/her avatar.

Figure 14:
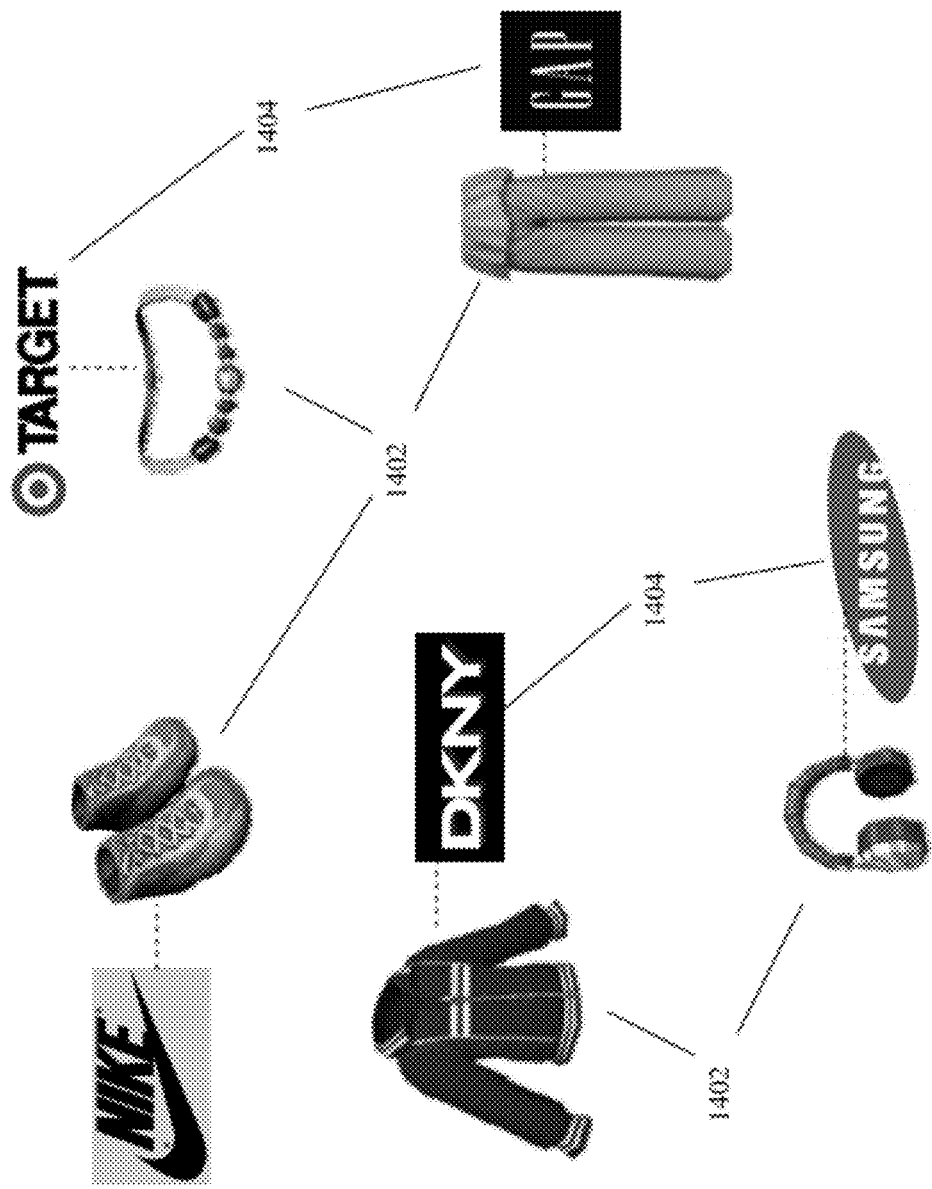

According to additional aspects of the invention, Virtual Collectibles distributed to users can be associated with brand names, thereby providing advertising value for partners of the system. This is shown in FIG. 14, where different Virtual Collectibles 1402 each have associated brands 1404 that can be either always displayed with the associated Virtual Collectible 1402, or displayed when a person mouses over the Virtual Collectible, for example. Each of the Virtual Collectibles 1402 shown in FIG. 14 can be used to customize a user's avatar, and can thus be displayed to other users whenever the user is interacting with them via chat, for example. However, branding is not limited to such accessories, and can be applied to other types of Virtual Collectibles.

Figure 15:
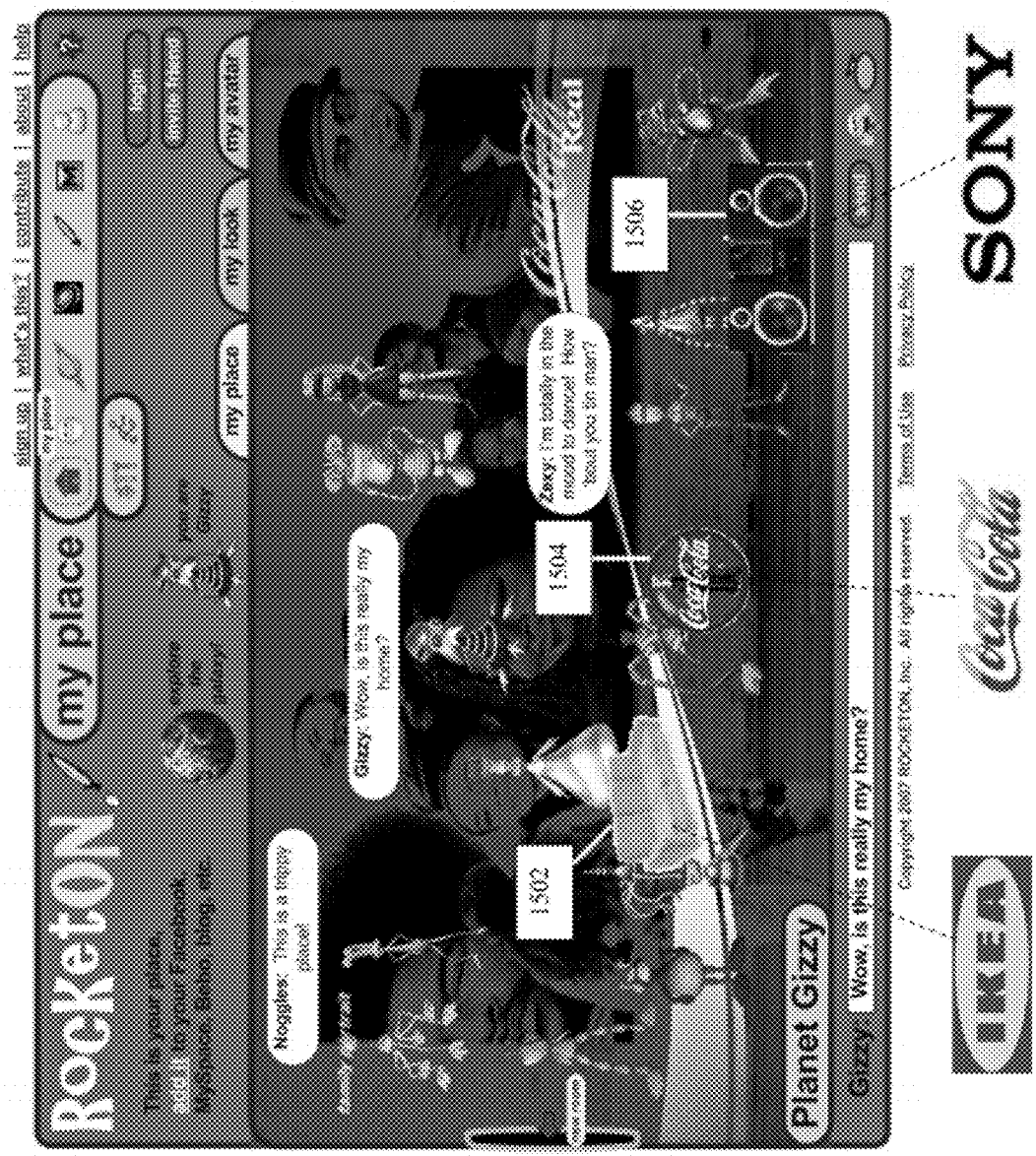

According to still further aspects of the invention, users can accumulate Virtual Collectibles in an account, and then redeem them for cash or other Virtual Collectibles, which can be used to customize an avatar, Virtual Collectibles, either branded or unbranded, or to customize a user's home space or chat room (such as a planet, as will be described in more detail below). For example, as shown in FIG. 15, a user can obtain Virtual Collectibles such as couch 1502, background 1504 and boombox 1506, each having associated brand names, and each being used to customize a user's home page or home chat room (i.e. virtual space). This further encourages users to exploit the distribution mechanisms provided by the invention while they are casually surfing the web.

Figure 16:
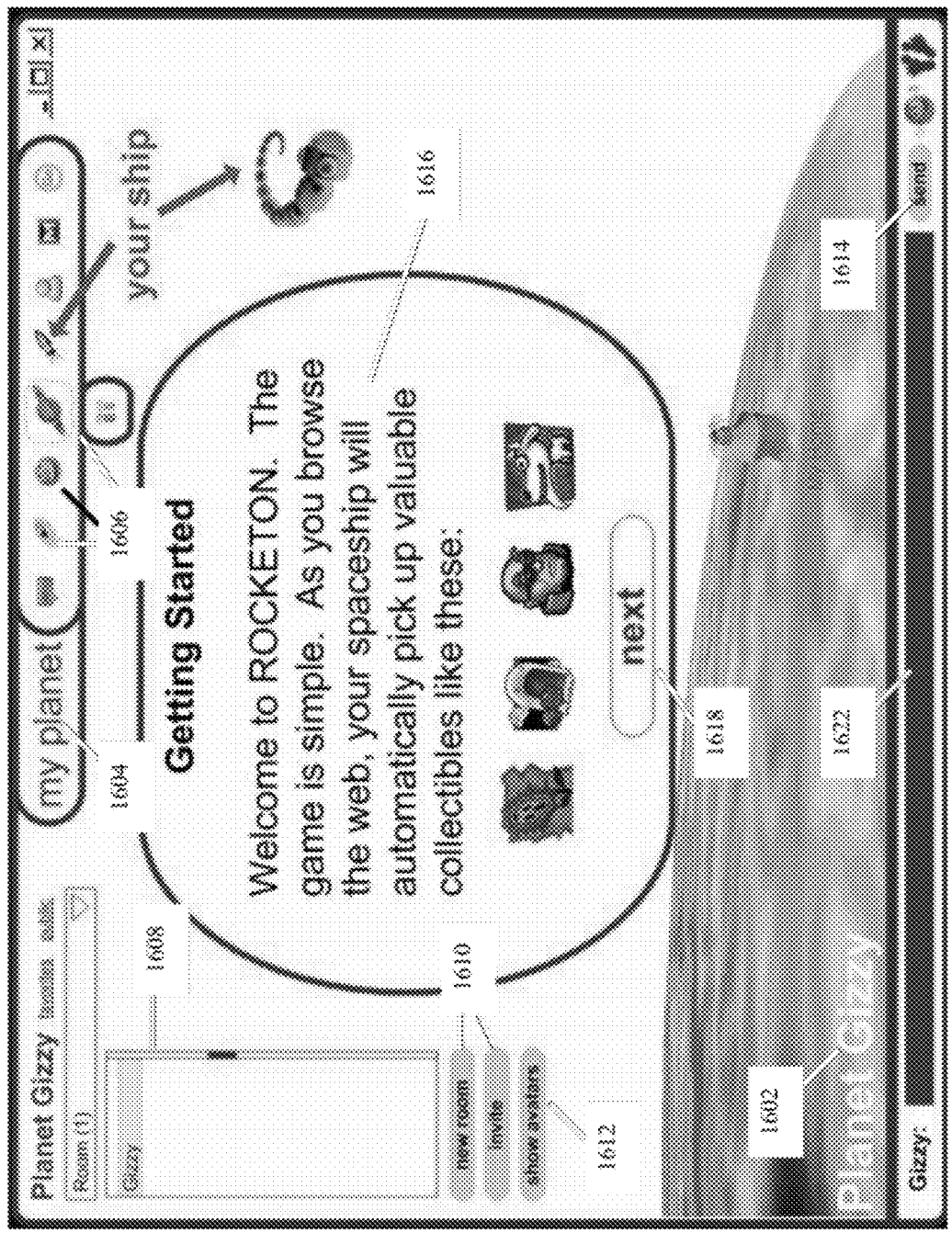

FIG. 16 is a screenshot illustrating an example starting page that is displayed after a client application (e.g. client 504) is first installed on the user's host computer. In one example, this screen is automatically displayed, either completely within the browser window, or in another browser window, after the installation of client is complete. Alternatively, this screen is displayed the first time a user launches the client application, for example by clicking on tray 1202 in FIG. 12. As shown in FIG. 16, the screen corresponds to the user's own planet, which is further identified with the user's username or screen name (in this case Gizzy) with planet name 1602. In embodiments, this planet corresponds to a chat room that is automatically created by the server when the user launches the client application and selects the "My Planet" page, as indicated by page title 1604. Different pages other than the "My Planet" page can be accessed by clicking on icons 1606, as will be described in more detail below.

In embodiments such as that shown in FIG. 16, all the users in the user's own planet/chat room are listed in list box 1608. Conventional chat functionality can be included for creating or joining a new room, and inviting other users via buttons 1610. Other users who join the user's chat room (i.e. Planet Gizzy in this particular embodiment) will be listed in box 1608, and their avatars can be viewed by selecting button 1612. The screen in FIG. 16 allows users to enter text in box 1622 and button 1614 when conversing with other users via conventional chat mechanisms provided by the server of the invention. The screen in FIG. 16 further displays a message 1616, either every time, or just the first time the "My Planet" page is displayed, or only when a user chooses a tutorial mode, explaining how users can acquire Virtual Collectibles. This message can further include a "Next" button 1618, which when pressed can cause additional screens explaining the system and possible games that the user can play using the system (e.g. finding Combos), how the user can earn points, and what those points can be used for, etc.

Figure 17:

FIG. 17 is a screenshot illustrating an example of how the user's own "My Planet" page can appear when the user is chatting with several different users. In embodiments, all users who are participating in the home user's (i.e. Gizzy) chat room also simultaneously see the same view as in FIG. 17. As shown in FIG. 17, other users in the home user's (i.e. Gizzy) planet/chat room are represented by their respective spaceships 1702. Moreover, their last entered chat message(s) 1704 are displayed adjacent to their spaceships, along with their usernames. By clicking on the "Show Avatars" button, each user's avatar is shown in place of their spaceship. At that point, the button can be changed to "Show Spaceships."

In this example, the home user's (i.e. Gizzy) planet/chat room has a "My Home" icon 1706, which is tied to the user's home planet/chat room. In embodiments, however, the user can have other "rooms" or virtual spaces associated with his/her account, and these can also be displayed as icons 1708 in the user's planet. The home room and other rooms can be considered Virtual Collectibles according to the invention, and can be acquired and accessorized in various ways as described above, and will become more apparent below.

As in the previous example, the list of users participating in the chat room is shown in box 1710. As further shown in FIG. 17, however, when any user clicks on a particular user, a set of buttons 1712 is displayed beneath the user's avatar 1714. These buttons allow the selecting user to view the selected user's profile, cargo, etc., and also to engage in certain user-to-user interactions such as trades, as will be explained in more detail below.

In the example of FIG. 17, users in the home user's (i.e. Gizzy) chat room/planet either specifically selected that room (e.g. are friends of Gizzy, or found Gizzy by browsing a directory of users or planets, etc.), or were invited by the home user (i.e. Gizzy). However, according to certain aspects, the invention can allow users to randomly connect, based on the web sites they are commonly visiting.

Figure 18:
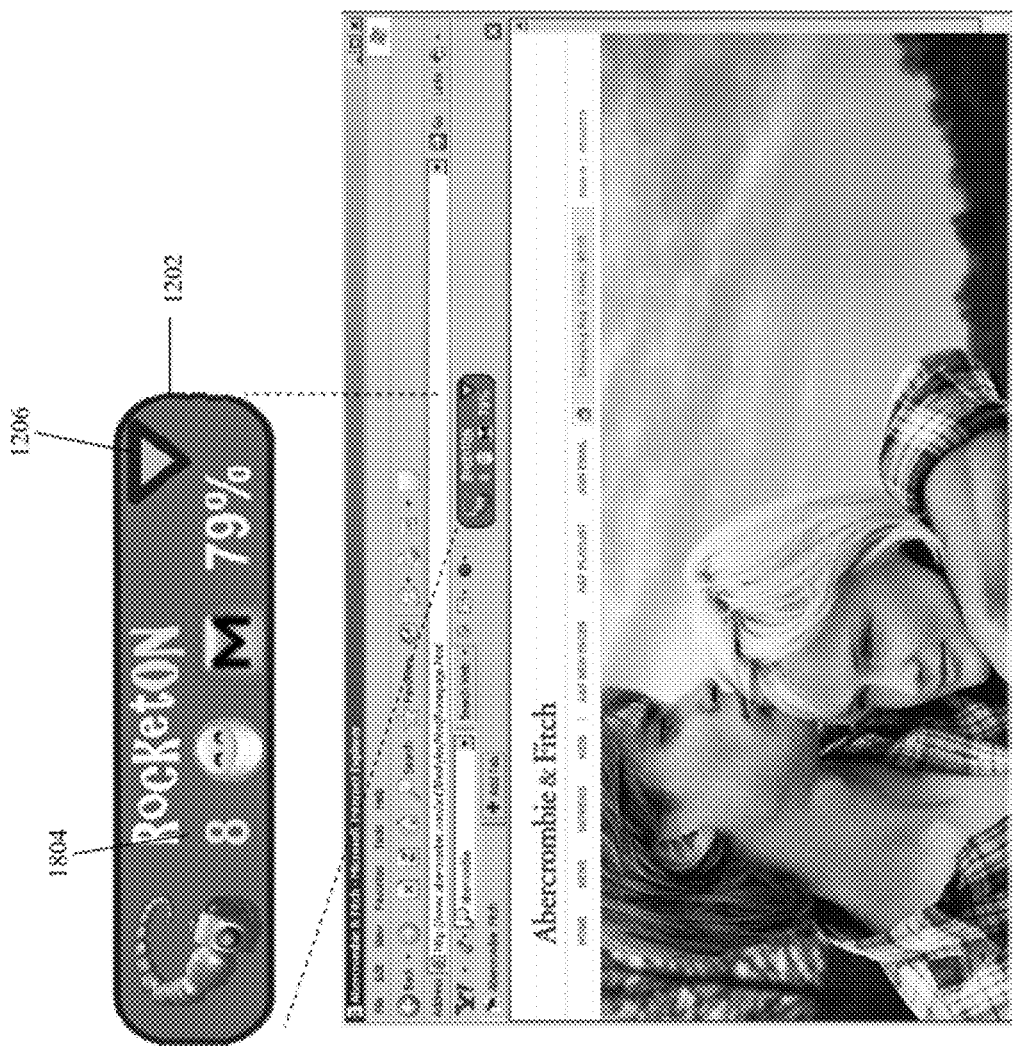

This is shown in FIG. 18, which is a screenshot illustrating an example of how the client application (e.g. client 504) and server (e.g. server 502) can interact while the user is surfing the web to inform the user about other users. As shown in FIG. 18, and described in more detail above, while a user is surfing the web using a browser such as Internet Explorer, the client application communicates the URL of the page of each new site that the user navigates to using the browser. The server compares the URL to its list of rules to determine whether any Virtual Collectibles can be made available to the user, and if so this is communicated by the server to the client, and the client can display a miniature image of the Virtual Collectible in tray 1202 as described above.

According to aspects of the invention, moreover, because the server can know all the URLs being visited by all users of the system, the server can determine whether other users are also currently visiting the website. If so, the server can automatically create a chat room associated with the website. The system can further display to the user(s) who are currently on that website the total number of system users visiting, as shown in indicator 1802. If the user wants to chat with these other users, the client can cause the user to launch a chat screen, and the server can add the user to the chat room associated with the website. This can be done in response to the user clicking on indicator 1804, or in response to the user selecting to join the chat room through a drop-down list provided when the user clicks on caret 1206, or automatically if/when users choose to join chat rooms automatically. If users wish to automatically join chat rooms, such chat rooms may be always present on top of the web page the users browse, and the users' avatars may appear on top of such web page.

Figure 19:
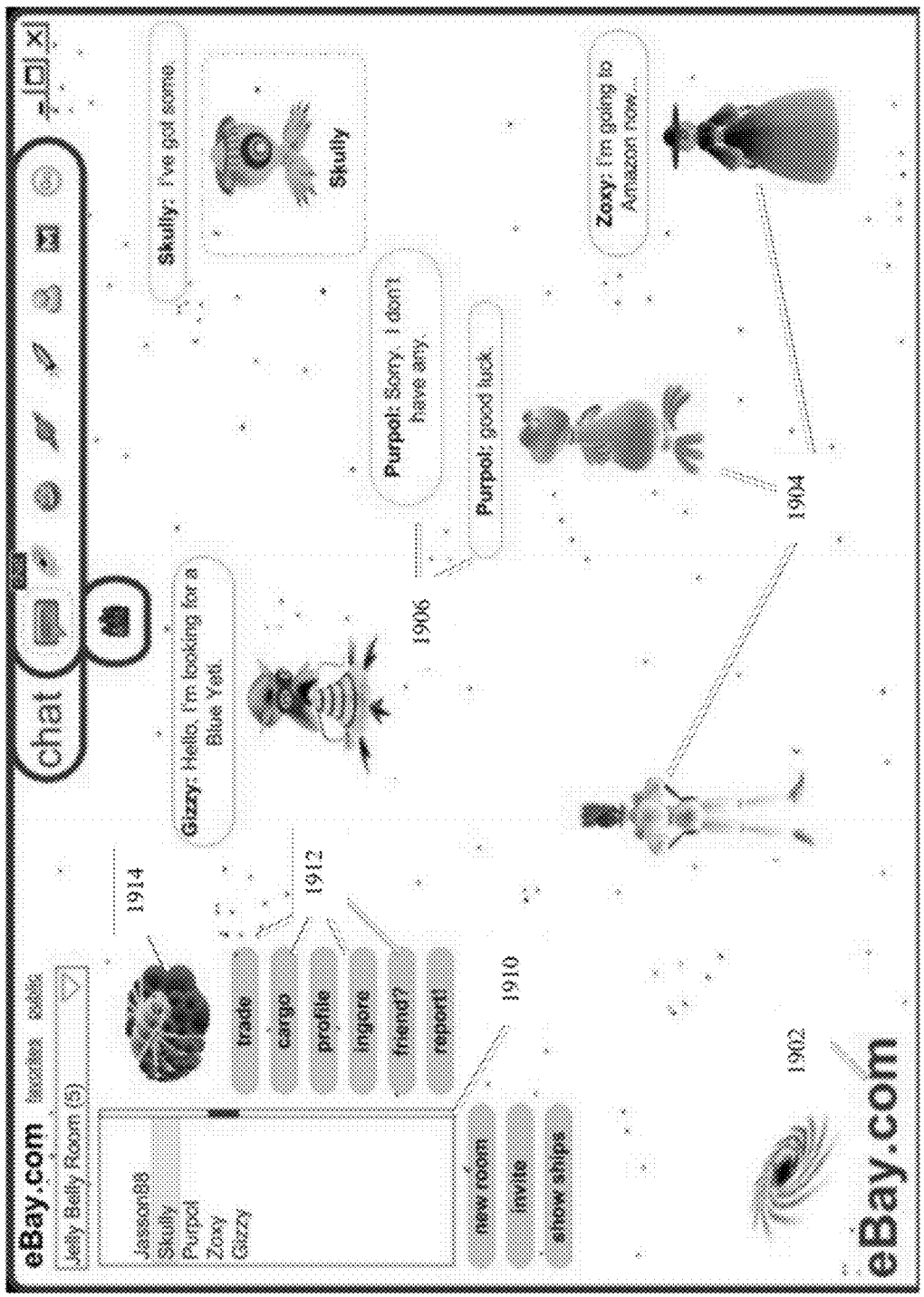

FIG. 19 is a screenshot illustrating an example of how a chat page can appear when the user elects to chat via the mechanisms described in FIG. 18, for example. As shown in FIG. 19, rather than any home user's planet/chat room, the chat room is associated with the common website visited by the users when they selected to join the chat, as indicated by website name 1902. Alternatively or additionally, the website can be represented by a web master (either real or virtual) who has a personalized avatar, spaceship and home planet, similar to other users. Moreover, the chat room associated with the website may have a transparent background, and so the users may see their chatting avatars on top of the web page(s) of the web site that the users are browsing.

As in the previous examples, users in the website chat room can be represented by their respective spaceships or avatars 1904, and their last entered chat message(s) 1906 can be displayed adjacent to their spaceships, along with their usernames. Moreover, in this particular embodiment, the list of users participating in the chat room is shown in box 1910, and any user can interact or view information about other users via buttons 1912 that are displayed beneath the user's spaceship 1914.

Figure 20:
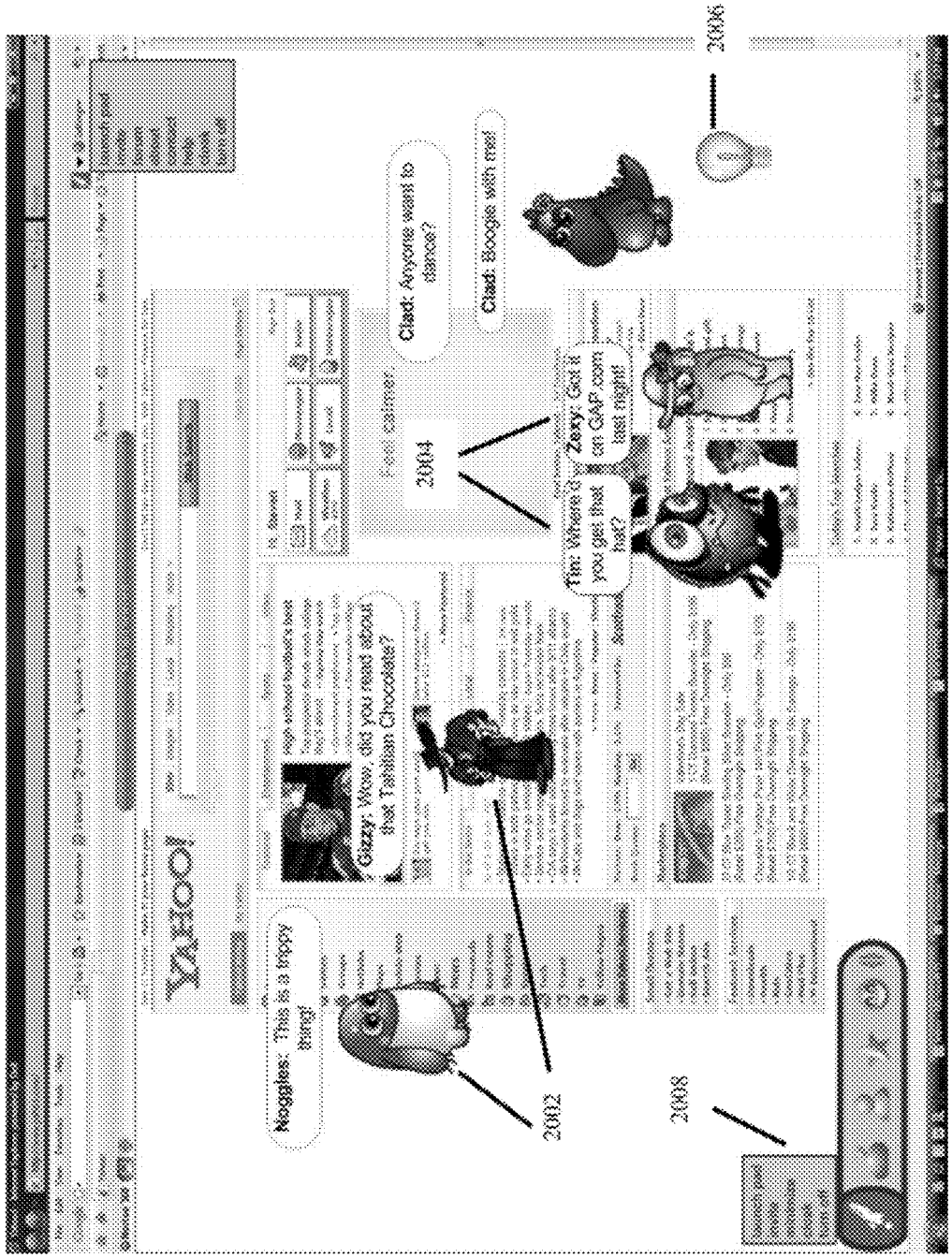

FIG. 20 illustrates additional or alternative examples of how the system can automatically allow users who are visiting the same web site to meet and/or communicate. In this example, rather than providing a separate interface and/or window from the website content, the system transforms a webpage the user is viewing into a Virtual Space. Accordingly, as shown in the example of FIG. 20, the system overlays avatars 2002 and chat messages 2004 on top of website content such as from Yahoo! when the system determines that any of the corresponding users are visiting the Yahoo! website. Furthermore, users are allowed to move their avatar 2002 through the resulting 2D space, for example, to move their avatar 2002 next to the avatar of another user.

In the example shown in FIG. 20, an enlarged toolbar 2008 is displayed in a corner of the browser window, rather than, or in addition to the browser toolbar 1202 as in other embodiments. This allows access to other functionalities of the system, as well as to provide access to means for configuring the display and/or application (e.g. to turn on/off the automatic Virtual Space overlay).

Light bulb 2006 below the dinosaur avatar is an example of a Virtual Collectible placed on top of a webpage, and made available to the user using the techniques of the invention described herein. The user associated with the dinosaur avatar can receive the light bulb 2006 by clicking on it.

According to aspects of the invention, the selective ability to socialize with other previously unknown users while casually surfing the web not only enhances the entertainment value of the system, but it allows users to identify other potential trading partners, make new friends, etc., thus further compelling users to use the system.

Moreover, according to aspects of the invention as mentioned above, in addition to acquiring and trading Virtual Collectibles for their entertainment value (e.g. to customize a user's avatar or home page/chat room), the system can conduct games to further motivate users to acquire one or more Virtual Collectibles, for example "Combos". An example of these aspects is further illustrated in FIG. 21. More particularly, in this example embodiment, a user's spaceship can include a cargo section which holds Virtual Collectibles that are acquired for points or other redemption value. The user can launch the screen in FIG. 21 by clicking on a caret in the client application icon in the browser toolbar, and selecting to view his/her cargo in a drop-down list, for example, or by clicking on the ship icon 2102 when the client application is already launched in full-screen mode, for example.

Figure 21:
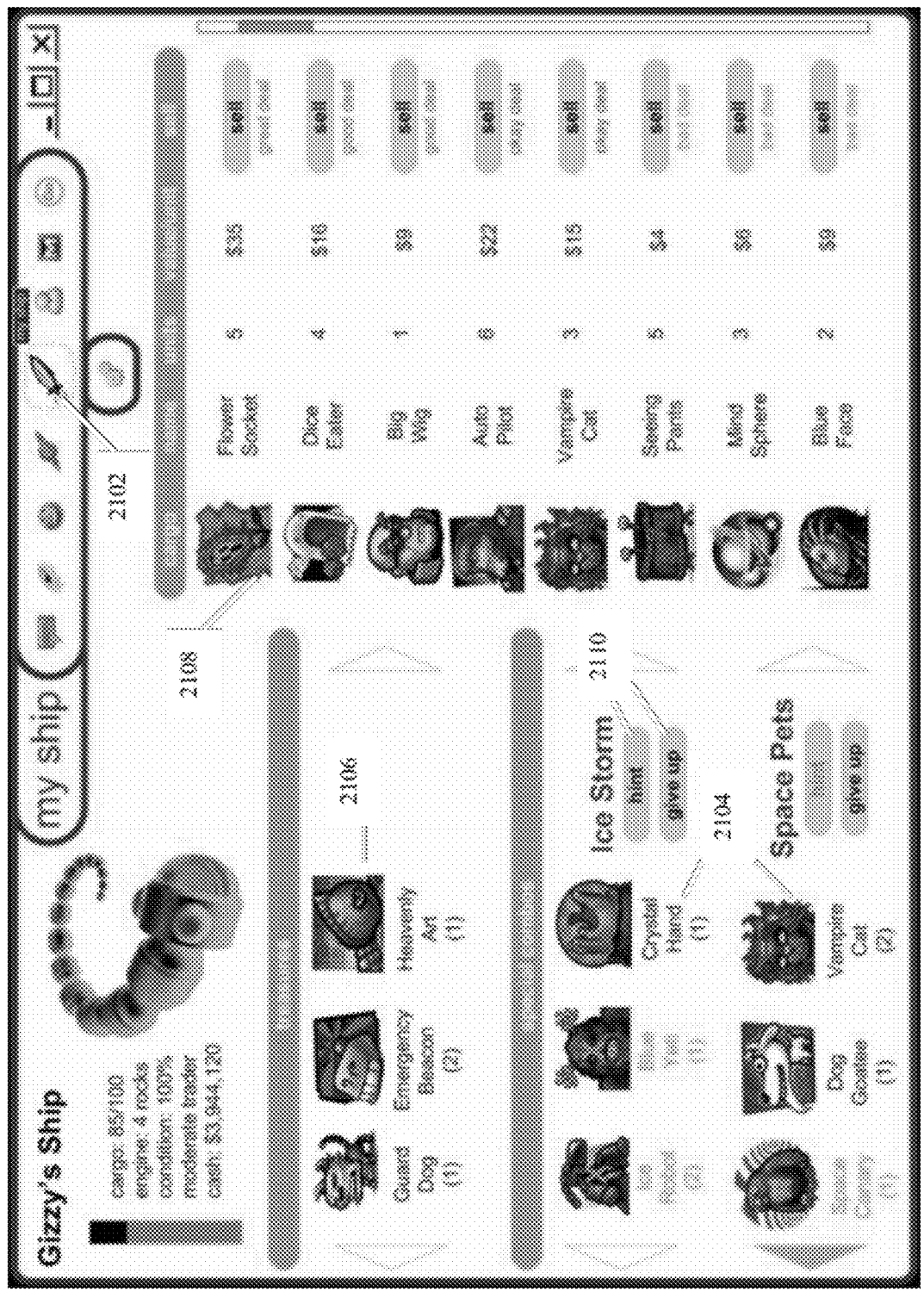

As shown in FIG. 21, a user's cargo of Virtual Collectibles can be displayed in categories such as combos 2104, special goodies (i.e. treasures) 2106, and other cargo 2108. In this example, combos 2104 display the Virtual Collectibles that a user has obtained, as well as the other Virtual Collectibles that are needed to complete the combo, with some indication that they are still needed (e.g. text descriptions in red). As shown in FIG. 21, the client application can display buttons 2110 that allow a user to either give up on the search for a specific combo, or to get a hint where they can find the missing Virtual Collectible. For example, the system can be configured to link certain Virtual Collectibles with partner web sites, and the hint can provide a clue as to the identity of that partner's web site.

According to some aspects, special goodies 2106 are Virtual Collectibles that provide certain functionality. For example, special goodies 2106 can include a guard dog that a user can place on their home page, and when another user visits the user's home page, the guard dog will bark at the other user, and the home page user will be sent a message or receive another indication that the other user is visiting his/her home page. Other cargo 2108 can include a list of all the Virtual Collectibles that are possessed by the user, along with their attributes such as redemption price, etc. It should be apparent that users can have multiple copies of one or more of their Virtual Collectibles, and the total number can also be displayed beside each Virtual Collectible.

According to certain aspects of the invention, further entertainment value for users (and as a result, added traffic for the system and partner web sites) can be provided by allowing users to trade Virtual Collectibles with other users, either for entertainment value itself, or to gain prizes according to the terms of a game conducted by the system, for example to obtain Combos.

Figure 22:
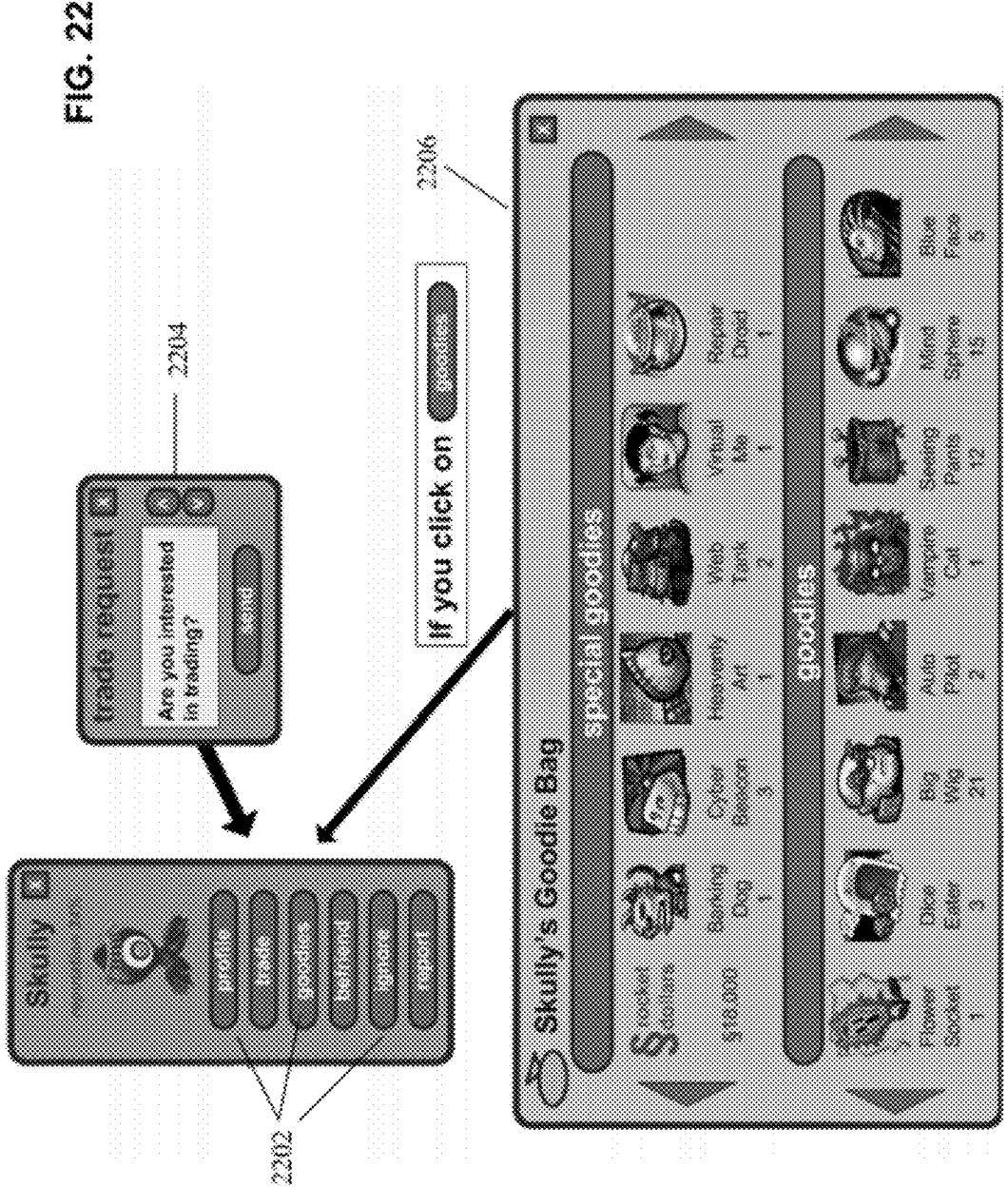

Trades can be initiated in a number of ways. For example, when users are in a chat room, such as that shown in FIG. 19, when a user's spaceship is moused over, or user's name in the list box is clicked as shown in FIG. 22, a popup 2202 appears, giving the viewing user the opportunity to look at the viewed user's cargo (e.g. popup 2206 in response to a button 2202 click) and see whether that user has anything interesting or needed by the viewing user. If so, the viewing user can initiate a trade dialogue with the viewed user (e.g. via popup 2204 in response to appropriate button 2202 click).

Figure 23:
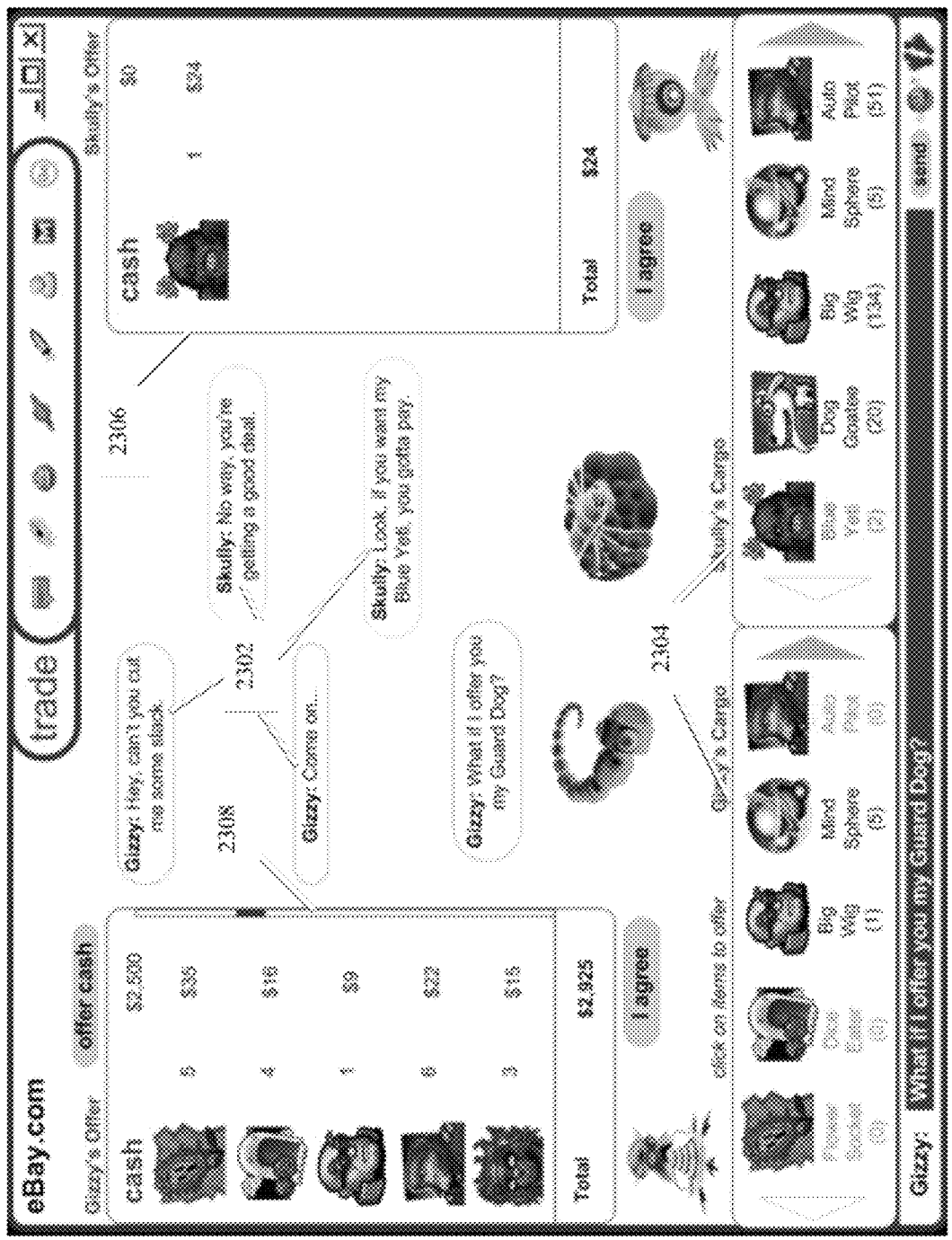

FIG. 23 is a screenshot illustrating an example of a trade page that can be presented to both users when a trade dialogue is initiated and accepted by both users as described in connection with FIG. 22, for example. As shown in FIG. 23, the users can chat with each other and their messages 2302 can be displayed on the page. Each user can see their own Virtual Collectibles in their respective boxes 2304 and select them for offering to trade. If the user has multiple copies, they can further select the number of copies to include in the trade via a popup for example. Each user is also displayed their current offers in respective boxes 2306, 2308. As further shown in FIG. 23, one or both of the users can include cash (real or virtual) in the trade. Once users agree on a trade, the system can update their respective accounts with the traded Virtual Collectibles.

The example implementations described above should be considered illustrative rather than limiting, and many combinations, divisions, deletions, alterations and supplementations even within the above described implementations are possible, as should become apparent to those skilled in the art.

Although not described in detail above, it should be apparent that similar and other screens such as those described above can be provided to allow users to view their personal and other account information, browse from a catalog and buy Virtual Collectibles from the system, redeem Virtual Collectibles for points, change their spaceship and avatars, buy and build chat rooms, etc.

It should be further apparent that the invention can provide many other features and functionality that are provided by conventional chat and social networking applications, though enhanced by the above-described features of the present invention, for example. Such functionality can include making friends, storing and updating friends lists, browsing and searching other users, their planets/home-base and their profiles, uploading and configuring multimedia content for home pages, sending mail, instant messages, pictures, etc. to other users of the system, change their online presence status, bookmark favorite sites and user pages, start online games alone or with other users of the system, and the like.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A system, comprising:
a website that a plurality of different users access via the public Internet;
a virtual world that is accessed via the website, the virtual world allowing the different users to interact with each other via respective avatars;
a client application residing on a host that one of the users uses to interact with the website on the Internet, the client application automatically monitoring the user's interactions;
a server in communication with the client application that is remote from the website both physically and with respect to Internet addresses,
wherein the client application further automatically communicates certain of the monitored user interactions to the server, and
wherein the server includes a distribution manager that determines whether to automatically distribute one or more virtual collectibles to the one user based on the communicated certain user interaction, and
wherein the virtual collectible comprises one or more of a static image, a moving image, a sound and a function; and
a list of rules that the distribution manager uses to lookup the communicated certain user interaction,
wherein the server further comprises a user communications manager that allows the one user to communicate with a group of other users, the group being determined based on the communicated certain user interaction, and
wherein the client application uses a multimedia player on the host to render the virtual collectible for perception by the user, and further to render digital content corresponding to the group of users and communications among the group of users, based on the communications between the client application and the server, and
wherein the digital content for each of the users includes an image representing a virtual identity, and wherein the client application further allows the user to reposition the image within a virtual space hosted by the server and rendered by the client application based on the communications between the client application and the server.

2. A system according to claim 1, wherein the server allows the one user to trade the distributed virtual collectible with another user in the group.

3. A system according to claim 1, wherein the certain user interaction comprises a URL requested by the one user via the host, and wherein the rules specify certain virtual collectibles to be automatically distributed for a plurality of predetermined URLs, and wherein the distribution manager compares the requested URL with the plurality of predetermined URLs to determine whether to distribute the virtual collectible to the one user.

4. A system according to claim 1, wherein the virtual collectible comprises one or more attributes including one or more of a predetermined visual appearance, a customizable visual appearance, an audible effect, an animation, and a function.

5. A system according to claim 1, wherein the server further includes an account manager that stores information regarding all virtual collectibles held by the one user, and wherein the information for each of the held virtual collectibles comprises one or more of a point value, a redemption value, and a bonus value.

6. A system according to claim 1, wherein the client application comprises a plug-in application for Internet access software loaded on the host.

7. A method, comprising:
providing a website that a plurality of different users access via the public Internet;
providing a virtual world that can be accessed via the website, the virtual world allowing the different users to interact with each other via respective avatars;
automatically monitoring, using a client application residing on a host that one of the users uses to interact with websites on the Internet, the user's interactions;
providing a server that is separate from the website both physically and with respect to Internet addresses;
automatically communicating, from the client application to the server, certain of the monitored user interactions;
determining, at the server, whether to automatically distribute one or more virtual collectibles to the user based on the communicated certain user interaction;
maintaining a list of rules for distributing virtual collectibles based on a plurality of predetermined user interactions, wherein the determining step includes comparing the communicated certain user action to the plurality of predetermined user interactions in the list of rules;

allowing the one user to communicate with a group of other users;

determining the group based on the communicated certain user interaction;

rendering by the client application, using a multimedia player on the host, the virtual collectible for perception by the one user;

further rendering, by the client application, digital content corresponding to the group of users and communications among the group of users, based on the communications between the client application and the server, wherein the digital content for each of the users includes an image representing a virtual identity, and wherein the method further includes:

hosting, by the server, a virtual space for the group of users;

allowing, by the client application, the user to reposition the image within the virtual space; and rendering, by the client application, the virtual space and the repositioned image based on the communications between the client application and the server.

8. A method according to claim 7, further comprising:

allowing the one user to trade the distributed virtual collectible with another user in the group.

9. A system according to claim 1, wherein certain of the virtual collectibles include content that is rendered for perception to the one user and other users during user interactions between the one user and the other users in the virtual world via the respective avatars.

10. A method according to claim 7, wherein certain of the virtual collectibles include content that is rendered for perception to the one user and other users during user interactions between the one user and the other users in the virtual world via the respective avatars.

* * * * *